US012505464B2

(12) United States Patent
Dommaraju et al.

(10) Patent No.: US 12,505,464 B2
(45) Date of Patent: Dec. 23, 2025

(54) INCREMENTAL VALUE ASSESSMENT TOOL AND USER INTERFACE

(71) Applicant: Target Brands, Inc., Minneapolis, MN (US)

(72) Inventors: Gopi Krishna Dommaraju, Plymouth, MN (US); Rebecca Goering, Waconia, MN (US); Jonathan Piepho, St. Louis Park, MN (US); Seth Pearce, Blaine, MN (US); David Rolfs, Maple Grove, MN (US); Sunitha Mahadevan, Golden Valley, MN (US); Kristina Coles, Minneapolis, MN (US); Colleen Theisen, Shoreview, MN (US)

(73) Assignee: Target Brands, Inc., Minneapolis, MN (US)

( * ) Notice: Subject to any disclaimer, the term of this patent is extended or adjusted under 35 U.S.C. 154(b) by 243 days.

(21) Appl. No.: 18/100,257

(22) Filed: Jan. 23, 2023

(65) Prior Publication Data

US 2023/0368230 A1 Nov. 16, 2023

Related U.S. Application Data

(60) Provisional application No. 63/341,009, filed on May 12, 2022.

(51) Int. Cl.
*G06Q 30/0201* (2023.01)
*G06Q 10/087* (2023.01)
*G06Q 30/0202* (2023.01)

(52) U.S. Cl.
CPC ... *G06Q 30/0206* (2013.01); *G06Q 30/02014* (2025.08); *G06Q 30/0202* (2013.01); *G06Q 30/02022* (2025.08); *G06Q 10/08724* (2025.08)

(58) Field of Classification Search
None
See application file for complete search history.

(56) References Cited

U.S. PATENT DOCUMENTS 8,386,285 B2 2/2013 Chen et al.
8,412,656 B1 4/2013 Baboo et al.
(Continued)

OTHER PUBLICATIONS

Hilliard, David, "Achieving and Sustaining an Optimal Product Portfolio in the Healthcare Industry through SKU Rationalization, Complexity Costing, and Dashboards", Jun. 2012, 76 pages.
(Continued)

*Primary Examiner* — Ivan R Goldberg
(74) *Attorney, Agent, or Firm* — Merchant & Gould P.C.

(57) ABSTRACT

A tool, method, and system for assessing an incremental value of one or more items in an item assortment are disclosed. The tool can receive historical purchasing data, which can include a plurality of customers purchasing one or more items of a plurality of items in an item assortment. The tool can use the historical purchasing data for the plurality of customers to simulate execution of removal of an item from the item assortment, wherein removal of the item from the item assortment causes an incremental loss associated with the item. The tool can order any number of items of the historical purchasing data. The tool can execute scenario simulations, and the tool can account for probabilities when interacting with the historical purchasing data. The tool can display assessment data and receive inputs via an interactive user interface. The tool can launch the assessment data in a downstream application.

18 Claims, 13 Drawing Sheets

(56) References Cited

U.S. PATENT DOCUMENTS

| | | | |
|---|---|---|---|
| 10,354,262 B1* | 7/2019 | Hershey | H04L 67/535 |
| 2001/0047293 A1 | 11/2001 | Waller et al. | |
| 2005/0075949 A1 | 4/2005 | Uhrig et al. | |
| 2005/0114196 A1* | 5/2005 | Schoenmeyr | G06Q 10/04 |
| | | | 705/7.29 |
| 2016/0210640 A1* | 7/2016 | Wu | G06Q 30/0202 |
| 2019/0180301 A1* | 6/2019 | Mahalanobish | G06Q 30/0206 |
| 2020/0005209 A1* | 1/2020 | Rangarajan | G06Q 10/087 |
| 2020/0019908 A1* | 1/2020 | Kolluru | G06F 18/231 |

OTHER PUBLICATIONS

Fisher, Marshall, "A Demand Estimation Procedure for Retail Assortment Optimization with Results from Implementations", University of Pennsylvania, Oct. 2014, 29 pages.

Kegalart, Tanguy, et al., "A conic optimization approach for SKU rationalization", Center for Opertions Research and Econometrics, Aug. 2014, 27 pages.

Alfaro, Jose A. et al., "The value of SKU rationalization in practice (The pooling effect under suboptimal inveiniory policies and non-normal demand)", Production and Operations Management, 12(1), 2003, 19 pages.

Boobar, Carly, "SKU Management for the Cosmetic Industry: What is the Best Policy for Product Portfolios?", May 7, 2018, 33 pages.

Mazzoleni, M. et al., "Control-oriented modeling of SKU-level demand in retail food market", Elsevier, IFAC PapersOnLine 50-1 (2017); 13003-13008.

Fields, David A., "Consumer Products SKU Rationalization", Whitepaper, Ascendant Consulting, LLC, 2006, 16 pages.

* cited by examiner

| | CATEGORY NAME | | | | Item 1: Brand A, Large |
|---|---|---|---|---|---|
| | Item 1 | Item 2 | Item 3 | Item 4 | Total ($) |
| Customer 1 | 10 | 30 | 20 | 10 | 70 |
| Customer 2 | 30 | 20 | 10 | | 60 |
| Customer 3 | 15 | 60 | | 20 | 95 |
| Customer 4 | 20 | | 10 | 30 | 60 |
| Customer 5 | | 20 | 10 | 15 | 45 |
| Customer 6 | 30 | 30 | | | 60 |
| Customer 7 | 60 | | 20 | | 80 |
| Customer 8 | 65 | | | 20 | 85 |
| Customer 9 | | 30 | 30 | | 60 |
| Customer 10 | | 20 | | 10 | 30 |
| Customer 11 | | | 60 | 30 | 90 |
| Customer 12 | 60 | | | | 60 |
| Customer 13 | | 30 | | | 30 |
| Customer 14 | | | 50 | | 50 |
| Customer 15 | | | | 70 | 70 |
| | | | | | 945 |

Item 1: Brand A, Large
Item 2: Brand A, Small
Item 3: Brand B
Item 4: Brand C, Organic

FIG. 4

|  | Item 1 | Item 2 | Item 3 | Item 4 | Total ($) |
|---|---|---|---|---|---|
| Customer 1 | 10 | 30 | 20 | 10 | 70 |
| Customer 2 | 30 | 20 | 10 |  | 60 |
| Customer 3 | 15 | 60 |  | 20 | 95 |
| Customre 4 | 20 |  | 10 | 30 | 60 |
| Customer 5 |  | 20 | 10 | 15 | 45 |
| Customer 6 | 30 | 30 |  |  | 60 |
| Customer 7 | 60 |  | 20 |  | 80 |
| Customer 8 | 65 |  |  | 20 | 85 |
| Customer 9 |  | 30 | 30 |  | 60 |
| Customer 10 |  | 20 |  | 10 | 30 |
| Customer 11 |  |  | 60 | 30 | 90 |
| Customer 12 | 60 |  |  |  | 60 |
| Customer 13 |  | 30 |  |  | 30 |
| Customer 14 |  |  | 50 |  | 50 |
| Customer 15 |  |  |  | 70 | 70 |
|  |  |  |  |  | 945 |

600a

Selected Item: Item 2
Selected Item-Loyal Customer: Customer 13
Incremental Loss ($): $30
Cumulative Loss: $30

INCREMENTAL VALUE ASSESSMENT TOOL AND USER INTERFACE

CROSS-REFERENCE TO RELATED APPLICATIONS

This application claims the benefit of priority to U.S. Provisional Application No. 63/341,009, filed May 12, 2022, which application is hereby incorporated in its entirety by reference.

BACKGROUND

There are various constraints and objectives when selecting items to offer for sale within a category. For example, as for the constraints, space on shelves may be limited, customers may prefer some items to others, sales of some items may take away sales of other items, operation costs (e.g., supply chain or overhead costs) may limit the number of possible items, customers may not want too many or too few items to choose from, and business considerations may require some items to be included and others to be excluded. As for the objectives, a retailer may seek to optimize a metric, whether it be revenue, profit, or purchases, or an objective may have multiple components, such as increasing or decreasing a metric while also increasing or decreasing exposure of a particular item. Compounding the difficulty of balancing constraints and objectives, the future effects of including an item in a category or excluding an item from a category can be unpredictable. Facing this unpredictability, as well as the various constraints and objectives, a retailer must nevertheless determine what items to offer for sale within a category.

Traditional approaches for selecting inventory items within a category to include in an assortment are limited. For example, some approaches may not use data, may use data anecdotally, or may use data in a limited way. Furthermore, some approaches may overlook the effects that purchases of items may have on purchases of other items. Additionally, some approaches can be less accurate because they do not account for purchasing behavior of actual customers. Furthermore, some approaches do not account for business requirements, such as needing to offer an item for sale for marketing or customer relation reasons.

SUMMARY

In general, the subject matter of the present disclosure relates to an incremental value assessment tool. In particular, the subject matter of the present disclosure relates to a tool that can receive and analyze purchasing data, determine an incremental value of an item within a category, and display assessment data via an interactive user interface.

In an example aspect, an incremental value assessment tool comprises An incremental value assessment tool comprising: a user interface; a value assessment Application Programming Interface (API); a processing unit; and a memory storing instruction, wherein the instructions, when executed by the processing unit, cause the incremental value assessment tool to: receive a request for assessment data from a user computing device at the value assessment API; receive historical purchasing data for a plurality of customers, wherein each customer of the plurality of customers purchases one or more items of a plurality of items within an item category assortment; based at least in part on the historical purchasing data, select an item of the plurality of items; using the historical purchasing data for the plurality of customers, simulate execution of removal of the item from the item category assortment, wherein removal of the item from the item category assortment causes an incremental loss associated with the item; generate assessment data comprising predicted purchasing data for the plurality of customers based on the removal of the item from the item category assortment and data corresponding to the incremental loss of the item; and display, via the user interface, the assessment data, wherein the user interface comprises a selectable option configured to launch the assessment data in a downstream application.

In a second aspect, a method for assessing incremental value comprises: receiving, at a value assessment Application Programming Interface (API), a request for assessment data from a user computing device; receiving historical purchasing data for a plurality of customers, wherein each customer of the plurality of customers purchases one or more items of a plurality of items within an item category assortment; using the historical purchasing data for the plurality of customers, simulating execution of removal of each of the plurality of items within the item category assortment, wherein removal of each item from the item category assortment causes an incremental loss associated with each item, and wherein each subsequent simulation executes removal of an additional item and simulations are performed until only one item remains in the item category assortment; generating assessment data comprising predicted purchasing data for the plurality of customers based on the removal of the item from the item category assortment and data corresponding to the incremental loss of the item; and based on the incremental loss associated with each item, generating an incremental loss curve representative of the incremental loss associated with the number of items removed from the item category assortment; and displaying, via the user interface, the assessment data and the incremental loss curve, wherein the user interface comprises a selectable option configured to launch the assessment data in a downstream application.

In a third aspect, a system for assessing incremental value includes a user interface; a value assessment Application Programming Interface (API); and a computing system including a database, a processor, and a memory communicatively coupled to the processor, the memory storing instructions executable by the processor to: receive a request for incremental assessment data from a user computing device at the value assessment API; receive historical purchasing data for a plurality of customers, wherein each customer of the plurality of customers purchases one or more items of a plurality of items within an item category assortment, the plurality of customers comprising exchanging customers and item-loyal customers, the historical purchasing data for exchanging customers indicating that more than one item of the plurality of items has been purchased, and the historical purchasing data for item-loyal customers indicating that only one of the plurality of items has been purchased; using the historical purchasing data for the plurality of customers, simulate execution of removal of the item from the item category assortment, wherein removal of the item from the item category assortment causes an incremental loss associated with the item, and wherein simulating execution of removal of the item from the item category assortment comprises: excluding customers from the historical purchasing data that have only made a single purchase of one item of the plurality of items; for each of the plurality of items, analyzing the incremental loss of removing the item from the item category assortment by, for exchanging customers, transferring a value associated with purchase of the item to the one or more other items, and excluding historical purchase data for item-loyal customers who have only bought the item; based on the incremental loss associated with each of the plurality of items, determining an order of removal of the plurality of items within the item category assortment, the order of removal being an ordered list based on an ascending incremental loss associated with removal of each of the plurality of items; generating assessment data comprising predicted purchasing data for the plurality of customers based on the removal of the item from the item category assortment and data corresponding to the incremental loss of the item; based on the incremental loss associated with each item, generating an incremental loss curve representative of the incremental loss associated with the number of items removed from the item category assortment in the determined order of removal; displaying the incremental loss curve on the user interface; in response to receiving a selection of a selectable option on the user interface from the user computing device, launching a downstream application; and automatically exporting, via the value assessment API, the assessment data into the downstream application.

BRIEF DESCRIPTION OF THE DRAWINGS

FIG. 4 illustrates example historical purchasing data useable by an incremental value assessment tool.

DETAILED DESCRIPTION

Figure 1:
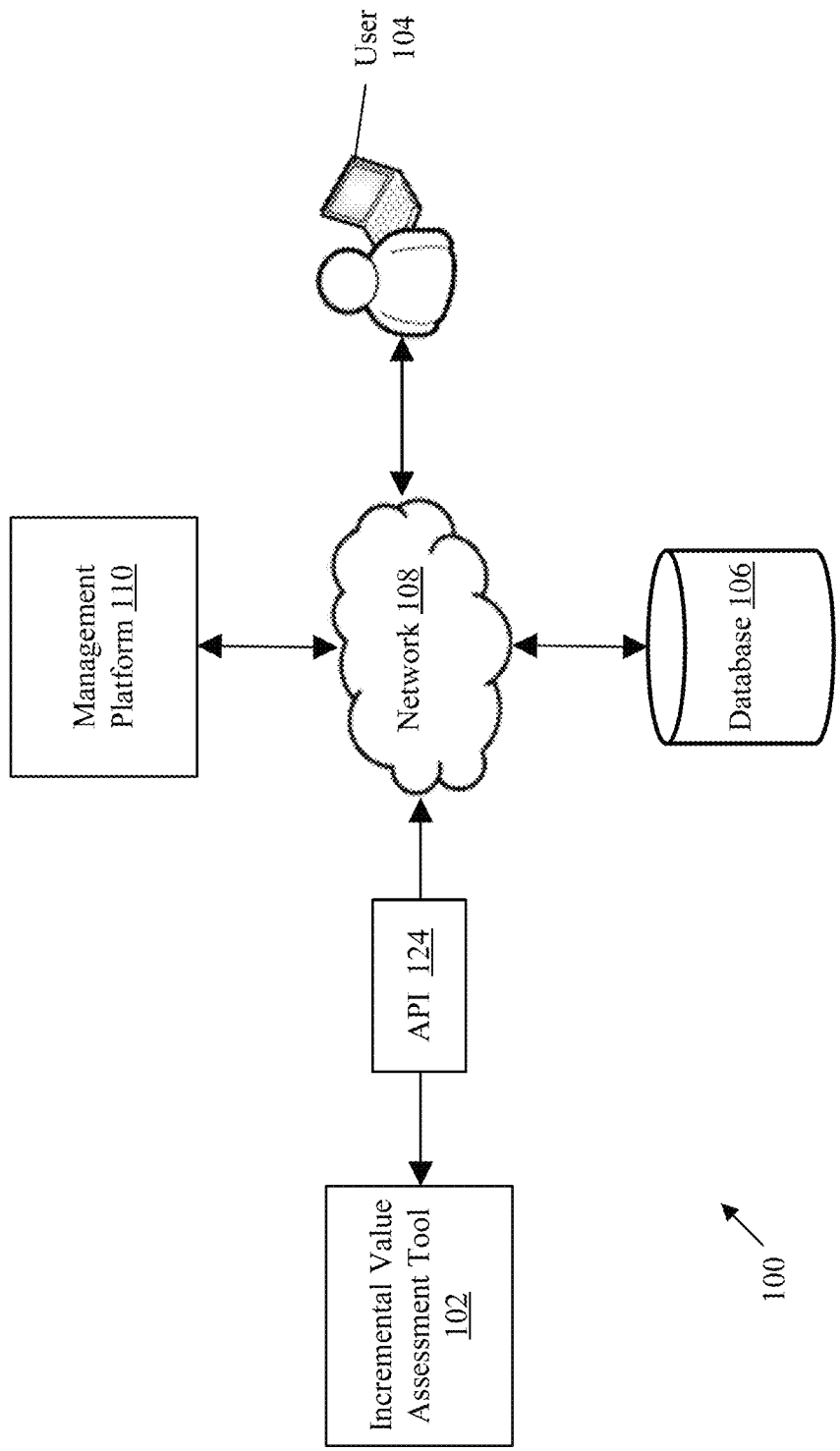
FIG. 1 illustrates a network in which aspects of the present disclosure can be implemented.

As briefly described above, embodiments of the present disclosure relate to a tool that can assess the incremental value of an item. The tool can, for example, run simulations to determine a loss that occurs when an item within an item category is removed from an assortment. The simulations can use historical purchasing data of customers to determine an incremental value of each item in an assortment, and display results from one or more simulations via an interactive user interface.

In example aspects, the tool can receive historical customer purchasing data. The purchasing data can include, for example, customer purchases of items within a category over a certain timeframe. The category can be, for example, a type of food or beverage, such as peanut butter or non-dairy milk. Within each category, there can be various items, such as products having different sizes or brands. For example, within the category of peanut butter, one item could be 16 ounce Skippy Peanut Butter, another could be 12 ounce Skippy Peanut Butter, and another could be 16 ounce Jiff Peanut Butter.

Having received historical purchasing data, the tool can associate each customer purchase with a particular customer, which may be done, for example, by using information linked to a credit card or by using other customer-identifying information. By doing so, the tool can analyze a single customer's purchasing behavior over time. Next, the tool can separate the customers into two categories: (1) exchanging customers, who purchased more than one items within an item category; and (2) item-loyal customers, who purchased only one item within the item category, even if they purchased that one item various times. In some embodiments, the tool can also exclude, from the historical purchasing data, customers who only made one purchase within the item category; that is, the tool can remove customers who only purchased only one item, on one occasion, from the category over the selected timeframe.

In example aspects, the tool can then use the historical purchasing data to determine the incremental value of items within the category. To do so, the tool can, for example, assess the loss caused by simulating a removal of the selected item from the category. When a selected item is removed from the assortment, the tool can, for example, simulate removal of item-loyal customers who only purchased the selected item. The loss caused by the removal of these item-loyal customers can be the incremental value of the item. As for exchanging customers who purchased the selected item and another item from the category, the tool can simulate a transfer of the purchases of the selected item to other items within the category. Furthermore, in some embodiments, the tool can iteratively simulate a removal of all items of the category, continuously selecting the item that causes a minimum incremental loss, thereby assessing the incremental value of each item of the category and ordering the items from least valuable to most valuable. Furthermore, in some embodiments, the tool can, when simulating a removal of item-loyal customers and a transfer of purchases of exchanging customers, use a probability distribution to determine which item-loyal customers to remove and, for exchanging customers, what items to transfer purchases to and what percent of sales should be transferred to those items. Thus, the tool can provide insight for items being removed by calculating what percentage of sales are from item-loyal customers, what percentage of sales may transfer to other items, and a breakdown of what percentage of sales may be transferred to what items. In some embodiments, the output from the tool may be exported into a downstream application for further analysis and/or use by a retailer, such as, for example, a planogram application, a demand forecast application, or a consumer decision tree application. Furthermore, in some embodiments, the tool can simulate a scenario by protecting certain items from removal or selecting certain items for removal, even if the items do not cause a minimum incremental loss.

In example aspects, the tool includes an interactive user interface that allows users to define a category of items to analyze, and that displays information related to items within the category, including the incremental value of the items. Furthermore, the user interface can display a graphical representation of the items, ordered based on an ascending incremental value. For example, the user interface can display a table or chart that includes the items of the category, an incremental value of each item, and a cumulative incremental value of a group of items. Furthermore, the user interface can include various other features for interacting with the tool, such as features for selecting parameters used during simulations, features for exporting, editing, and comparing data, and features for running scenario-based simulations.

Certain embodiments of the present disclosure have technical features that make them particularly advantageous over existing tools. For example, by using the tool, a retailer has a data-driven perspective on the value of items within an assortment. Thus, when needing, for example, to eliminate items from an assortment, a retailer can use the tool to determine which items would cause a minimum loss if removed, how the removal of items would affect other items, and what the net result of removal would be. Likewise, when needing to add items into an assortment, for example at new store, a retailer can use the tool to determine the most effective order in which to add them. Thus, across a variety of use cases, the tool enables a retailer to make more informed, efficient, and accurate choices when determining the make-up of an assortment of items.

Furthermore, because the tool can be coupled with a database that includes historical purchasing data across categories, the tool can be used to analyze various categories in various timeframes, thereby increasing the tool's flexibility. Additionally, because the tool can be integrated with real-world, customer-level purchasing data, the tool can improve accuracy in assessing the incremental value of an item. Furthermore, the tool can provide performance and usability advantages by offering a variety of features via a user interface. For example, the user interface can communicate information about items in a form that is user friendly and conducive to cross-department collaboration. The user interface may also be configured to launch a downstream application and automatically export data generated by the tool into the downstream application for further use or analysis by the retailer. As another example, the user interface can allow a user to select a variety of simulation parameters. Furthermore, some embodiments of the tool allow a user to execute and compare a plurality of scenarios that account for constraints faced by retailers, such as operating constraints (e.g., available space and costs), and business constraints (e.g., needing to have a certain brand). As will be apparent, these are only some of the advantages offered by the invention of the present disclosure.

FIG. 1 illustrates an example network environment 100 in which aspects of the present disclosure can be implemented. The network environment 100 includes an incremental value assessment tool 102, a user 104, a database 106, and a management platform 110. In some embodiments, the environment 100 can include more or less components than those shown in the example of FIG. 1. In some embodiments, each of the incremental value assessment tool 102, the user 104, the database 106, and the management platform 110 can be coupled with one another via the network 108. The network 108 can be, for example, the Internet, an internal network, or another type of network that facilitates communication between one or more of the components of the environment 100. A value assessment application programming interface (API) 124 may facilitate communication between the incremental value assessment tool 102 and the user 104 over one or more networks, such as the network 108. For example, receipt of a request from the user 104 to determine incremental assessment data at the API 124 may cause the API 124 to trigger the incremental value assessment tool 102 to perform a simulation.

The incremental value assessment tool 102, which is further described below, can determine an incremental value of an item and display data via a user interface. The incremental value assessment tool 102 can receive data from the database 106. For example, the database 106 can store historical purchasing data, and the incremental value assessment tool 102 can receive the historical purchasing data from the database 106. In some embodiments, the database 106 can include a variety of databases, and it can be coupled with systems for collecting and organizing data, such as systems that detect, record, and organize customer transactions. The user 104 can be, for example, a data analyst, an employee of a retail store who selects an assortment of items to offer for sale, or a program that integrates the incremental value assessment tool 102 into another system or program. The user 104 can, for example, access the incremental value assessment tool 102 by using a computer, and the user 104 can interact with the incremental value assessment tool 102 via a user interface of the incremental value assessment tool 102. Features of the user interface and examples of interaction between the user 104 and the incremental value assessment tool 102 are further described below.

The management platform 110 can, for example, integrate the incremental value assessment tool 102 into a program for managing an assortment of items, managing a supply chain network, analyzing inventory data, or another program that can use an output of the incremental value assessment tool 102. For example, as described below, the incremental value assessment tool 102 can determine an incremental value for a plurality of items within an assortment of items and automatically provide this data to the management platform 110. In some embodiments, the management platform 110 can automatically receive and use this data as part of performing actions within a different program or system. For example, in response to receiving (e.g., from the incremental value assessment tool 102) data indicating that a particular item has a relatively low or high incremental value, the management platform 110 can, for example, make changes to the quantity ordered of that item or make changes to how that item flows through a supply chain. Furthermore, in some embodiments, the management platform 110 can optimize item assortments and/or supply chain operations for one or more particular retail locations by using a loss curve, which is further described below in connection with FIG. 5, that is generated and provided by the incremental value assessment tool 102.

Figure 2:
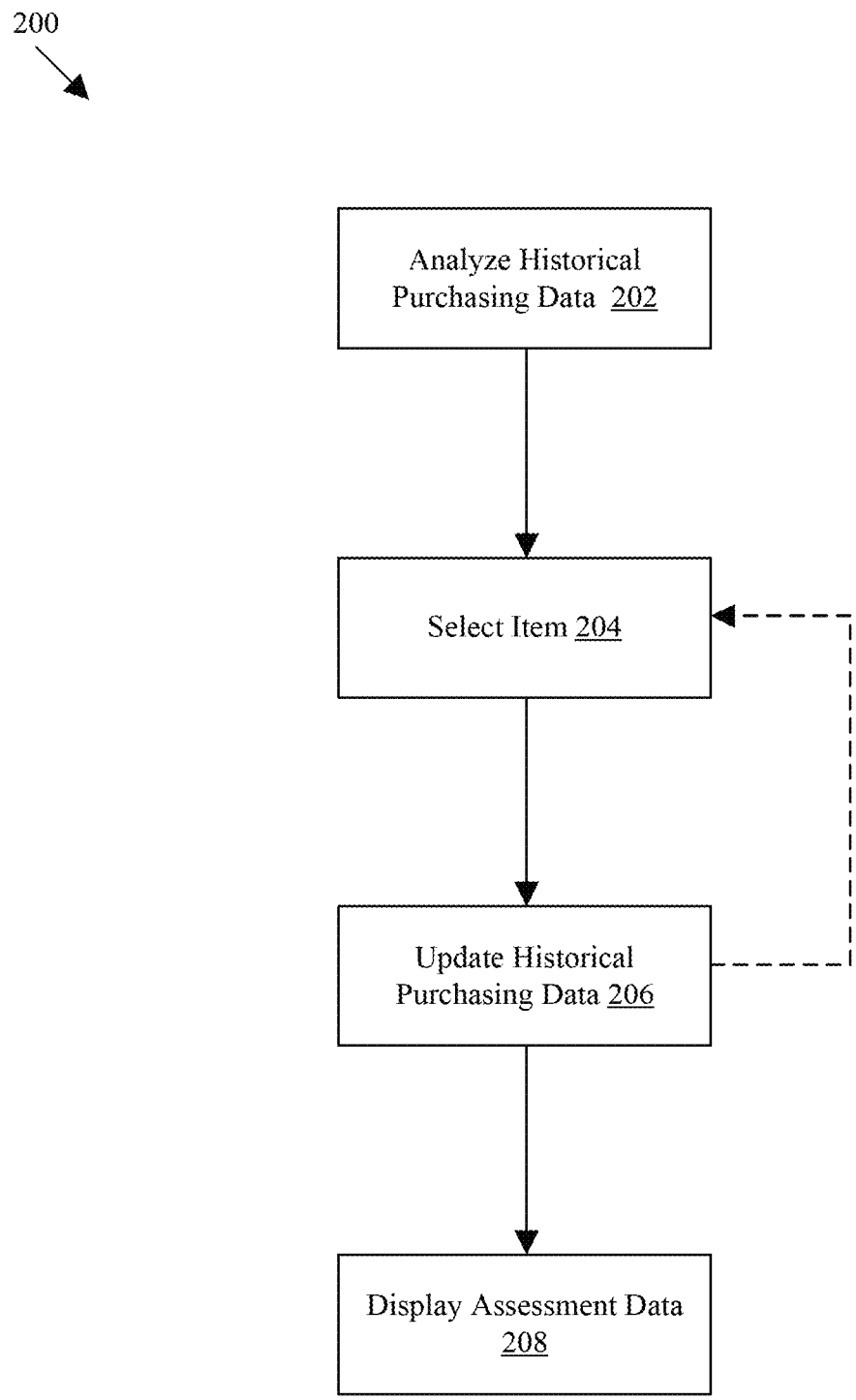
FIG. 2 is a flowchart of an example method useable by an incremental value assessment tool.

FIG. 2 illustrates an example method 200 useable, for example, by the incremental value assessment tool 102. When performing a simulation, the incremental value assessment tool 102 can, for example, execute aspects of the method 200. In the example of FIG. 2, the method 200 is described generally; in the examples of FIGS. 3-8, examples of steps of the method 200 are described in more detail. For example, analyzing purchasing data (step 202) is further described in connection with FIGS. 3-4, selecting an item (step 204) and updating purchasing data (step 206) are further described in connection with FIGS. 5-6, and displaying assessment data (step 208) is further described in connection with FIGS. 5 and 7-8. Additionally, various examples and features of the steps of the method 200 are described throughout the present disclosure.

In the example shown, the incremental value assessment tool 102 can analyze purchasing data (step 202). In some embodiments, analyzing purchasing data can consist of receiving historical purchasing data; in other embodiments, analyzing purchasing data can include any one or more of receiving, editing, or grouping historical purchasing data, as is further described below. The historical purchasing data can include transaction information related to purchases of items of a category. Each transaction can include a customer and one or more items purchased by the customer from that category. In some embodiments, the incremental value assessment tool 102 can determine, for each customer included in the historical purchasing data, the purchasing behavior of that customer within the category. Furthermore, in some embodiments, the historical purchasing data can include data related to customer purchases across a plurality of stores. In some embodiments, the historical purchasing data can include data related to customer purchases for a particular location. Analyzing purchasing data is further described below in connection with FIG. 3, and example historical purchasing data is shown in the example of FIG. 4.

In the example shown, the incremental value assessment tool 102 can select an item from the historical purchasing data (step 204). Simulating a removal of the selected item from the historical purchasing data can cause an incremental loss. The incremental loss can be, for example, a decrease in a metric, such as revenue, profit, number of sales, or another metric. In some embodiments, the incremental loss caused by simulating a removal of the selected item is equivalent to the selected item's incremental value. In some embodiments, such as when the incremental value assessment tool 102 determines an incremental value for a plurality of items, the incremental value assessment tool 102 can update the historical purchasing data (step 206), which can include, among other things, removing the selected item from the historical purchasing data and removing customers who only purchased the selected item. Furthermore, in some embodiments and under certain conditions, the incremental value assessment tool 102 can then select another item from the historical purchasing data (thereby returning to the step 204, as shown by the dashed line in FIG. 2). The steps 204 and 206 are further described in connection with FIG. 5 and an example execution of aspects of the steps 204 and 206 is discussed in connection with FIGS. 6A and 6B.

In the example shown, the incremental value assessment tool 102 can display assessment data (step 208). For example, the incremental value assessment tool 102 can include a user interface, and the user interface can display assessment data. The assessment data can include, among other things, a selected item and an incremental value associated with the selected item. In some embodiments, moreover, the assessment data can include a plurality of items, a graphical representation of the items and their respective incremental values, and a comparison of items and their incremental values when various simulations are executed. Displaying the assessment data is further described below in connection with FIGS. 5 and 7-8.

Figure 3:
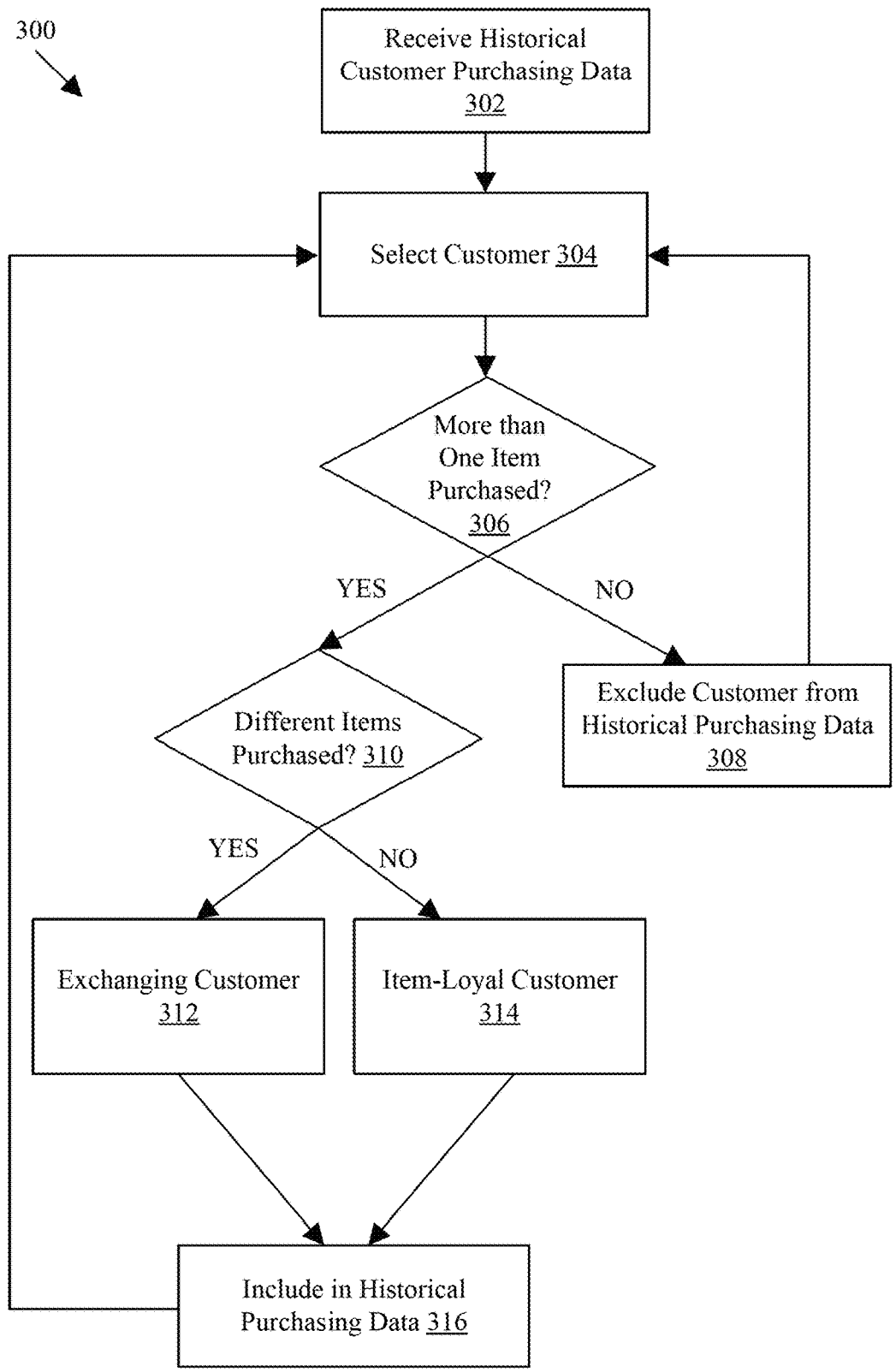
FIG. 3 is a flowchart of an example method useable by an incremental value assessment tool.

FIG. 3 illustrates an example method 300 useable, for example, by the incremental value assessment tool 102. For example, the method 300 can be used by the incremental value assessment tool 102 as part of analyzing purchasing data (e.g., as part of performing step 202 of the method 200).

In the example shown, the incremental value assessment tool 102 can receive historical customer purchasing data (step 302). In some embodiments, the incremental value assessment tool 102 can receive the historical customer purchasing data from the database 106. In some embodiments, the historical customer purchasing data can relate to purchases that occurred within a certain timeframe, such as within the last six months, nine months, a certain number of years, a different amount of time, or the timeframe can be defined by a start date and an end date. The historical customer purchasing data can include a plurality of transactions that occurred within the timeframe. Each transaction can include a customer purchasing one or more items.

In some embodiments, the incremental value assessment tool 102 can request historical customer purchasing data related to purchases of items from a particular category. In such embodiments, the historical purchasing data includes customer purchases of one or more items that belong to that category. For example, the category can be a food, such as peanut butter. In some embodiments, any combination of a brand, size, or other characteristic can constitute a separate item within the category. For example, items within a peanut butter category may include, for example, Skippy Creamy 16 oz., Skippy Creamy 12 oz., Skippy Chunky 16 oz, Jiff Creamy 40 oz., Jif Natural Creamy 16 oz., Smucker's Organic Creamy 16 oz., and so on. In some embodiments, moreover, a category can be defined more broadly (e.g., spreads) or narrowly (e.g., creamy peanut butter).

In the example shown, the incremental value assessment tool 102 can select a customer from the historical purchasing data (step 304). For example, the incremental value assessment tool 102 can use customer-identifying information to select a customer from the historical purchasing data and can group all the purchases of that customer. The customer-identifying information can be, for example, credit card information, membership information, or any other information useable to link a particular customer to one or more purchases. Having selected the customer, the incremental value assessment tool 102 can, in some embodiments, evaluate the items—which can belong, for example, to a category—that were purchased by that customer over the timeframe.

In the example shown, the incremental value assessment tool 102 can remove certain customers from the historical purchasing data by determining whether the selected customer (e.g., the customer selected at step 304) purchased more than one item from the category within the timeframe. In response to determining that the customer purchased only one item from the category on only one occasion, the incremental value assessment tool 102 can remove that customer from the historical purchasing data (step 308) and select a different customer (returning to step 304). In response to determining that the customer purchased more than one item—either the same item multiple times or different items—the incremental value assessment tool 102 can next determine whether the customer purchased different items (e.g., moving to step 310). By removing customers that only purchased a single item from the category, the incremental value assessment tool 102 can, for example, discard those customers whose purchasing behavior is difficult to predict or is unlikely to repeat; thus, the incremental value assessment tool 102 can, in some embodiments, run more accurate simulations and better assess an incremental value of an item by ignoring these single-purchase customers.

In the example shown, the incremental value assessment tool 102 can determine whether the selected customer purchased different items within the category (step 310). In response to determining that the customer purchased multiple of the same item—and only that one item from the category—over the timeframe, the incremental value assessment tool 102 can determine that the customer is an item-loyal customer (step 314), and then the customer can be included in the historical purchasing data (step 316). In response to determining that the customer purchased different items within the category over the timeframe, the incremental value assessment tool can determine that the customer is an exchanging customer (step 312), and the customer can be included in the purchasing data (step 316). Furthermore, in some embodiments, irrespective of whether the customer is an item-loyal customer or an exchanging customer, the incremental value assessment tool 102 can, as part of including the customer in the historical purchasing data, group the customer with other customers who purchased the same item or the same combination of items.

For example, returning to the peanut butter category example, if a first customer purchased five units of Skippy Chunky 16 oz. in the given timeframe, then the first customer purchased more than one item within the category (e.g., taking the "YES" branch from step 306 to step 310). If, however, the first customer only purchased Skippy Chunky 16 oz. and did not purchase any other items within the peanut butter category, the customer will be identified as an item-loyal customer (e.g., taking the "NO" branch from step 310 to step 314). Therefore, the incremental value assessment tool 102 can include the first customer in the historical purchasing data as an item-loyal customer. Furthermore, in some embodiments, the first customer can be grouped with other item-loyal customers who only purchased Skippy Chunky 16 oz., even if those other customers purchased more or less units of Skippy Creamy 16 oz than the number of units purchased by the first customer. As another example, if a second customer purchased one unit of Skippy Creamy 16 oz., three units of Skippy Creamy 12 oz., and two units of Jiff Creamy 16 oz., then the second customer could be determined to be an exchanging customer (e.g., taking the "YES" branch from step 310 to step 312) and included in the historical purchasing data. Furthermore, in some embodiments, the second customer would be grouped with other customers who also bought a combination of Skippy Creamy 16 oz., Skippy Creamy 12 oz., and Jiff Creamy 16 oz., even if the other customers purchased more or less of each of those items than the second customer purchased.

FIG. 4 illustrates example historical purchasing data 400. The historical purchasing data 400 includes a plurality of customers (e.g., customers 1-15), and each of the customers purchases one or more items of a plurality of items (e.g., items 1-4). In the example of FIG. 4, each of the items belongs to a single item category. In some embodiments, the name of the category can be in the category name space 402. As shown in the item description space 404, each of the items 1-4 can differ from one another based on its brand, size, or other characteristic.

In the example of FIG. 4, each of the customers has purchased a certain dollar amount of one or more of the items 1-4. The shaded boxes indicate that the customer has purchased that item; the white boxes indicate that the customer has not purchased that item. The customers 1-11 are exchanging customers, because they purchased more than one unique item within the category. The customers 12-15 are item-loyal customers, because they purchased only one item within the category. For illustrative purposes, the present disclosure frequently refers to embodiments in which a customer of the purchasing data is a single customer. In other embodiments, however, the incremental value assessment tool 102 can group customers, as described above in more detail with reference to FIG. 3. For example, each of the customers 1-15 of the example of FIG. 4 can be a group of customers that purchased a particular combination of items. For example, the customer 7 may be a combination of all customers who purchased only item 1 and item 3, and together, these customers spent $60 on item 1 and $20 on item 3. Furthermore, in some embodiments, if there is a combination of items that no customer purchased, then the incremental value assessment tool 102 can insert a placeholder customer group for that combination of items. For example, if no customers purchased only items 1, 3, and 4 (i.e., if customer 4 as shown in FIG. 4 did not exist), then the incremental value assessment tool 102 can, in some embodiments, insert a placeholder customer in customer 4's position but indicate that the purchase amounts for items 1, 3, and 4 are all zero for the placeholder customer.

In the example of FIG. 4, the numbers displayed in the historical purchasing data 400 indicate how much a customer spent on an item. For each customer, the amount spent is totaled. In the example of FIG. 4, the total amount spent by each customer is added to calculate a gross revenue 406, which, in the example of FIG. 4, is equal to $945. For illustrative purposes, the present disclosure generally refers to embodiments in which historical purchasing data includes sales and revenue data. However, in other embodiments, the historical purchasing data, rather than including sales, can include a different metric, such as profit or number of units of an item purchased. In such embodiments, the historical purchasing data, rather than calculating a gross revenue, includes a different cumulative metric, such as gross profit or total number of units sold.

Figure 5:
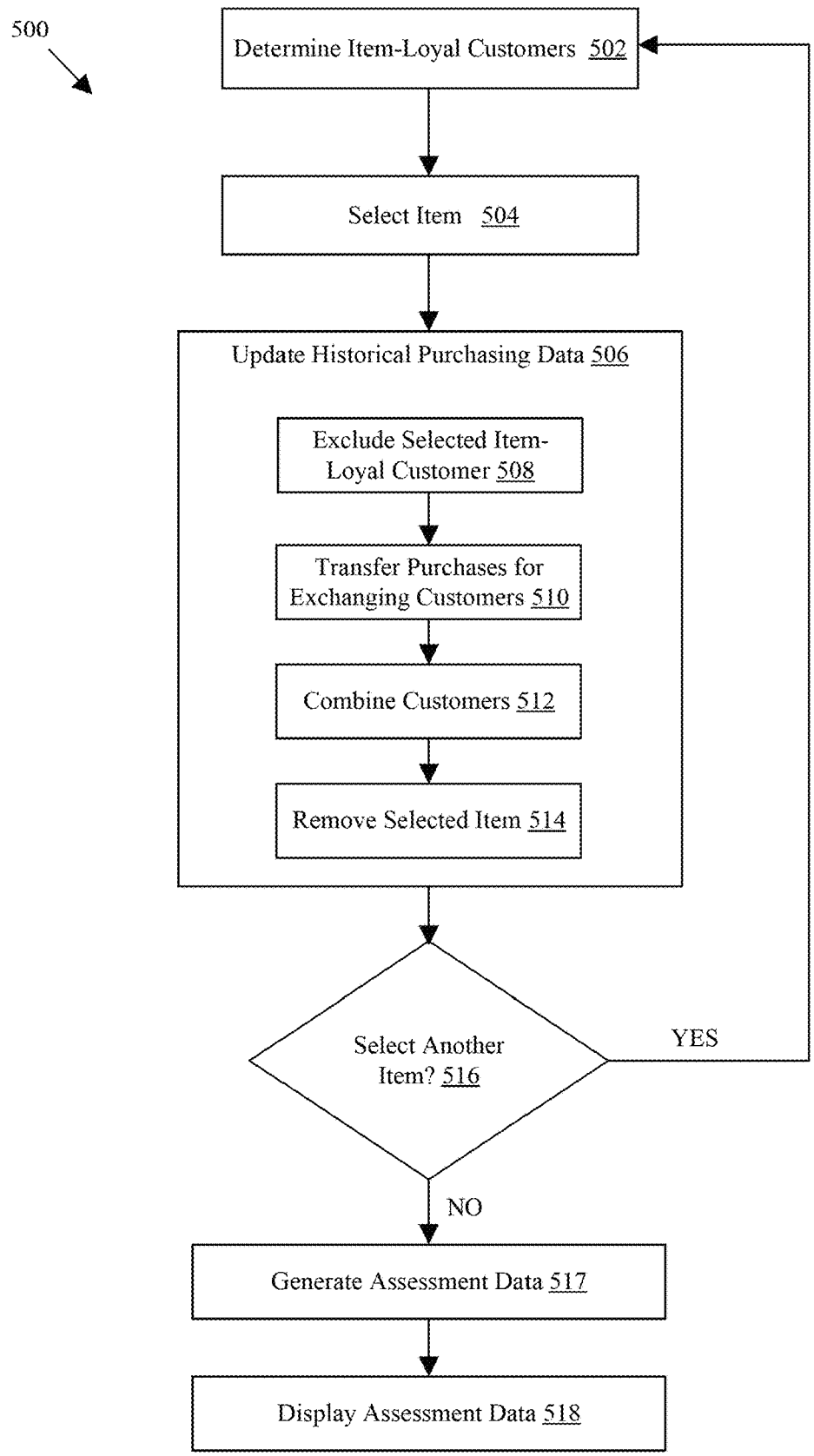
FIG. 5 is a flowchart of an example method useable by an incremental value assessment tool.

FIG. 5 is a flowchart of an example method 500 usable, for example, by the incremental value assessment tool 102. For example, the method 500 can be used by the incremental value assessment tool 102 as part of simulating a selection and removal of an item and as part of updating the historical purchasing data (e.g., as part of performing steps 204 and 206 of the method 200). An example operation of aspects of the method 500 is illustrated and discussed below in connection with the FIGS. 6A-6B.

In the example of FIG. 5, the incremental value assessment tool 102 can determine which customers of the historical purchasing data are item-loyal customers (step 502). For example, referring to the example of FIG. 4, the incremental value assessment tool 102 can determine that customers 11-15 are item-loyal customers. As part of determining which customers are item loyal customers, the incremental value assessment tool 102 can also determine which item each item-loyal customer purchased and how much each of the item-loyal customers spent on their respective items. For example, referring again to the example of FIG. 4, the incremental value assessment tool 102 can determine that customer 12 (or, in some embodiments, the group of customers that make up customer 12) spent $60 on item 1.

In the example shown, the incremental value assessment tool 102 can use the historical purchasing data to select an item from a plurality of items of an item assortment (step 504). In some embodiments, the incremental value assessment tool 102 can select the item that causes a minimum incremental loss when removed from the item assortment. In some embodiments, the incremental value assessment tool 102 can select an item based on the amount spent by item-loyal customers. For example, the incremental value assessment tool 102 can, when selecting an item, determine which item-loyal customer spent the least and then select the item that corresponds with that item-loyal customer. Such an item, if removed from an assortment, can cause a minimum incremental loss. For example, in the example of FIG. 4, the item loyal-customer that spent the least is customer 13; therefore, the incremental value assessment tool 102 can select item 2. When removed, item 2 can, in this example, cause a minimum incremental lost. For example, when compared with a potential loss caused by a potential removal of any of the other items, the removal of item 2 causes the minimum loss.

In some embodiments, the incremental value assessment tool 102 can select an item based on a scenario. For example, the incremental value assessment tool 102 can, in some embodiments, receive a scenario input, and based on the scenario input, the incremental value assessment tool 102 can execute a scenario simulation. When executing the scenario simulation, the incremental value assessment tool 102 can still, as a default, select an item causing a minimum incremental loss when removed. However, the scenario input can include one or more scenario items. Each of the scenario items can be items belonging to the assortment of items included in the historical purchasing data. The scenario input can indicate, for each of the scenario items, whether the item is protected or is designated for priority removal. Furthermore, in some embodiments, the scenario input can indicate that a group of items is protected (i.e., will not be removed from the assortment) or designated for priority removal. Thus, in some examples, one or more items can be designated as protected, one or more items can be designated for priority removal, and one or more items can be neither protected nor designated for priority removal. In some embodiments, even if an item is not designated for priority removal, the item can nevertheless be selected and removed by the incremental value assessment tool 102, for example if there are no items designated for priority removal.

Furthermore, in some embodiments, the scenario input can indicate a conditional status for a scenario item. The conditional status can indicate that whether an item is, for example, protected or designated for priority removal depends, for example, on whether or not another item has been removed or on other information in the historical purchasing data or in the incremental value assessment tool 102. For example, the scenario input may indicate that an item is protected, but only if all other items of that item's size or brand have been removed.

During a scenario-based simulation, the incremental value assessment tool 102 can, when selecting an item (e.g., at step 504), account for whether an item is protected or designated for priority removal. For example, if the scenario input indicates that a particular item is protected, then the incremental value assessment tool 102 can, in some embodiments, elect not to select that item or, in some embodiments, elect not to select that item until a certain number of items have already been selected and removed. Thus, in some embodiments, even if an item causes a minimum incremental loss if removed, the incremental value assessment tool 102 can, if the item is protected, skip that item and select another item instead. On the other hand, if the scenario input indicates that an item is designated for priority removal, then the incremental value assessment tool 102 can select that item (e.g., at step 504) even if that item does not cause a minimum incremental loss if removed. In some embodiments, for an item that is designated for priority removal, the scenario input can indicate that the item is to be removed after a certain number of items have been selected and removed, and the incremental value assessment tool 102 can select the item designated for priority removal at that point.

Accordingly, in some embodiments, the incremental value assessment tool 102 can, when executing a scenario simulation, alter the order in which items are selected, based on whether items are protected or are designated for priority removal. As is discussed elsewhere in the present disclosure, the incremental value assessment tool 102 can therefore be more flexible and can better account for business constraints and other considerations.

In the example shown, the incremental value assessment tool 102, having selected an item, can update the historical purchasing data used to simulate execution of removing the item from the item category assortment by excluding historical purchase data for at least one customer (step 506). In the example of FIG. 5, the incremental value assessment tool 102, as part of updating the purchasing data, can select the item-loyal customer who purchased the selected item and can remove, from the historical purchasing data, the selected item-loyal customer (step 508). For example, referring to the example of FIG. 4, if the selected item is item 2, the incremental value assessment tool 102 can select and remove customer 13 from the historical purchasing data 400, resulting in a loss of the $30 spent by customer 13.

In some embodiments, however, the incremental value assessment tool 102 can, rather than removing the entire amount spent by the selected item-loyal customer, transfer some percent of the purchases of the selected item to other items. For example, referring to the example of FIG. 4, the incremental value assessment tool 102 can, if the selected item is item 2, transfer a percent of or all of customer 13's purchases of item 2 to other items, and then remove customer 13. As another example, if customer 13 is a group of customers who purchase only item 2, the incremental value assessment tool 102 can determine, for example based on a probability, that one or more of the customers that make up customer 13 is a transfer customer, which can be a customer who only purchased item 2, but who would purchase one or more of the other items if item 2 is unavailable. The one or more other items that the transfer customer would purchase can be predicted replacement items. The result, in such an embodiment, can be that somewhere between $0-$30 of the $30 spent by the customer 13 can transfer to other items, and the transfer customers who previously formed part of customer 13 can, for example, transfer to another customer group, and some portion of or all of their purchases can transfer to the one or more predicted replacement items.

In the example shown, the incremental value assessment tool 102 can transfer values associated with purchases for exchanging customers (step 510). For example, the incremental value assessment tool 102 can select exchanging customers of the historical purchasing data who purchased the selected item and one or more other items of the plurality of items. Next, the incremental value assessment tool 102 can transfer a value associated with purchases of the selected item to the other items purchased by the exchanging customers. In some embodiments, the incremental value assessment tool 102 can distribute the purchases of the selected item evenly across the other items purchased by the exchanging customers; in other embodiments, the incremental value assessment tool 102 can use a probability distribution to determine which of the other items to transfer purchases of the selected item to and at what percentages (e.g., 20% does not transfer; 30% transfers to item 1; 15% transfers to item 2; 35% transfers to item 3). The probability distribution can be based, for example, on previous purchasing data of one or more specific customers, on general previous purchasing data, on predicted future purchases, on information input by a user via the user interface, or on other data. In some embodiments, the probability distribution can indicate to transfer the purchase of the selected item to an item that had not previously been purchased by the exchanging customer.

As an example of transferring purchases for exchanging customers, referring now to the example of FIG. 4, if the selected item is item 2, then the exchanging customers for which to transfer purchases would be customers 1-3, 5-6, and 9-10. For each of those customers, the incremental value assessment tool 102 can transfer the sales of item 2 to other items purchased by those customers. Depending on the embodiment, the incremental value assessment tool 102 can transfer the purchases of item 2 evenly to the other items purchased by the customers, or the incremental value assessment tool 102 can transfer the purchases of item 2 to the other items purchased by the customers in varying percentages based on a probability distribution. In some embodiments, for customers who did not purchase the selected item (e.g., if item 2 is the selected item, then customers 4, 7-8, 11-12, and 14-15), the incremental value assessment tool 102 can elect not to transfer any of the purchases.

In the example shown, the incremental value assessment tool 102 can, having removed the selected item-loyal customer and having transferred purchases for exchanging customers, combine customers (step 512). For example, after the transfer of customer purchases, the historical purchasing data can include customers who purchase the same combination of items who, previously, did not purchase the same combination of items. In some embodiments, the incremental value assessment tool 102 can combine these customers and combine their purchases. For example, referring now to the example of FIG. 4, if item 2 is the selected item, then in some embodiments, the purchases of item 2 by customer 6 can be transferred to item 1, resulting in customer 6 purchasing $60 of only item 1. Furthermore, the incremental value assessment tool 102 can group customer 6 and customer 12, because both customer 6 and customer 12 purchase only item 1. Following this grouping, the combined customer 6 and customer 12 can purchase $120 of item 1, and the combined customer 6 and 12 can be an item-loyal customer of item 1. Furthermore, the incremental value assessment tool 102 can, in some embodiments, group together all customers having the same combination of items purchased following the transfer of purchases of the selected item, as illustrated below in connection with the example of FIGS. 6A-6B.

In the example shown, the incremental value assessment tool 102 can remove the selected item from the historical purchasing data (step 514). Removing the selected item from the historical purchasing data can reflect, for example, simulating a removal of the item from an assortment of items. Referring now to the example of FIG. 4, if the selected item is item 2, then the incremental value assessment tool can remove item 2 from the purchasing data 400.

In the example shown, the incremental value assessment tool 102 can determine whether to select another item (step 516). For example, even after removing an item from the historical purchasing data (e.g., at step 514), there may be items remaining in the historical purchasing data. In some embodiments, having determined that there are more items remaining in the purchasing data, the incremental value assessment tool 102 can elect to select another item (e.g., taking the "YES" branch and returning to the step 502) until there are no more items remaining in the historical purchasing data or until only one item remains. In other embodiments, the incremental value assessment tool 102 can keep a count of the number of items selected and removed and can continue to select another item (e.g., taking the "YES" branch and returning to the step 502) until the count reaches a predetermined number. In such an embodiment, once the incremental value assessment tool 102 has reached the predetermined number, it can elect to not select another item (e.g., taking the "NO" branch to the step 517). In yet other embodiments, the incremental value assessment tool 102 can determine whether to select another item based on an incremental loss caused by a removal of an item or based on a cumulative loss caused by a removal of a plurality of items. When determining whether to select another item, the incremental value assessment tool 102 can, in some embodiments, use information entered by a user via a user interface, such as information regarding how many items to select and remove, how much loss is to accrue before electing not to select another item, or other information.

In some embodiments, the incremental value assessment tool 102 can create an order of items of the plurality of items by deciding to select another item (e.g., taking the "YES" branch and returning to the step 502). The order can be, for example, the order in which items are selected using the historical purchasing data. The incremental value assessment tool 102 can, in some embodiments, update and store information relating to this order, and to items of the historical purchasing data, as the incremental value assessment tool 102 iterates through the steps 502-516 of the method 500. The number of iterations performed by the incremental value assessment tool 102 can depend on the embodiment. In some embodiments, the incremental value assessment tool 102 can select and order all items of the purchasing data; in other embodiments, less than all of the items can be selected and ordered.

In some embodiments, for example when the incremental value assessment 102 repeatedly selects an item causing a minimum incremental loss when removed, the order created by the incremental value assessment tool 102 can be an optimal order. Furthermore, in some embodiments, the order can be modified by a scenario input, in which case a protected item can be positioned relatively later in the order than it would be in an optimal order, and an item designated for priority removal can be positioned relatively earlier in the order than it would be in an optimal order. In yet other embodiments, the incremental value assessment tool 102 can create and store a plurality of orders, depending, for example, on one or more inputs received via a user interface, on information from the purchasing data, or on other information.

In some embodiments, the incremental value assessment tool 102 can, by using an order of items and by using an incremental loss associated with one or more items, generate an incremental loss curve. The incremental loss curve can illustrate, for example, the cumulative incremental loss as the incremental value assessment tool 102 iteratively simulates removing items from an assortment of items. As the number of items removed increases, the incremental loss curve can indicate that the total incremental loss associated with the increasing number of items removed is also increasing. In some embodiments, such as when the historical purchasing data relates to transactions at one or more particular locations, the loss curve can be specific to those one or more particular locations. As with other data generated by the incremental value assessment tool 102, the incremental value assessment tool 102 can automatically provide the loss curve to another system (e.g., the management platform 110) for use in other programs, such as programs that manage supply chains, optimize item assortments within a category, or manage purchasing decisions. As described below, the incremental value assessment tool 102 can also display the incremental loss curve via a user interface.

Furthermore, in some embodiments, the incremental value assessment tool 102 can create a plurality of loss curves. The value associated with each of the loss curves can depend, for example, on the order used to generate the loss curve. For example, in some embodiments, the incremental value assessment tool 102 can generate an optimal order and a loss curve corresponding to the optimal order. Furthermore, in some embodiments, the incremental value assessment tool 102 can generate a modified loss curve that corresponds, for example, to an order generated during a scenario-based simulation, in which one or more items are, for example, protected or designated for priority removal. As described below in connection with FIGS. 7-8, both a loss curve associated with an optimal order and a loss curve associated with the modified order can be displayed via a user interface. In some examples, both curves can be depicted on the same graph, thereby allowing a user to compare the relative effects of forcing the exclusion or inclusion of one or more particular items.

In the example shown, the incremental value assessment tool 102 can generate assessment data (step 517) and display assessment data (step 518). The assessment data can, for example, comprise data related to the historical purchasing data, items or customers included in the historical purchasing data, removal of an item from an assortment of items, one or more incremental values of one or more items, an order of one or more items, or other information related to the historical purchasing data or derived by the incremental value assessment tool 102. Furthermore, the assessment data can include one or more graphical representations of data, such as tables, charts, graphs, or lists that include item data and incremental values of these items. The incremental value assessment tool 102 can include a user interface, which is further described below, and the user interface can display, among other things, the assessment data.

Figure 6A:
FIG. 6A illustrates a first iteration of an example execution of aspects of a method useable by an incremental value assessment tool.
Figure 6B:
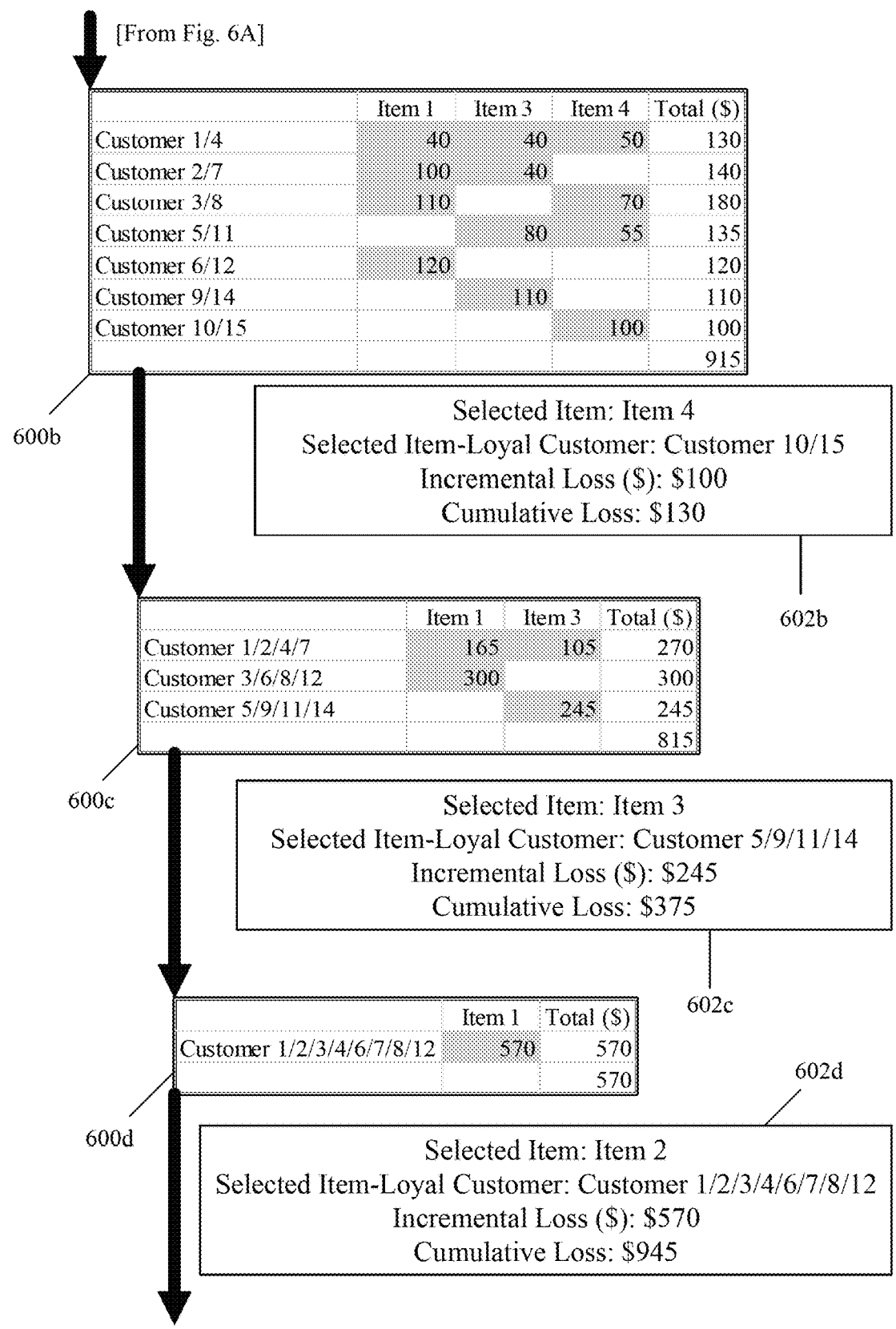
FIG. 6B illustrates a second, third, and fourth iteration of an example execution of aspects of a method useable by an incremental value assessment tool.

FIGS. 6A-6B illustrate aspects of an example simulation executed by the incremental value assessment tool 102. The example of FIGS. 6A-6B includes example historical purchasing data 600a-d. Furthermore, the example of FIGS. 6A-6B includes example data 602a-d derived by the incremental value assessment tool 102. In the example of FIGS. 6A-6B, the incremental value assessment tool 102 selects an item that causes a minimum incremental loss, and a scenario simulation is not executed. The example of FIGS. 6A-6B is merely an illustration of example aspects of the present disclosure. In other examples, the historical purchasing data can, for example, include more or less information, the incremental value assessment tool 102 can perform a different series of operations, and the incremental value assessment tool 102 can derive more or less data than the data shown in the example data 602a-d.

The example purchasing data 600a comprises a plurality of customers (e.g., customers 1-15), each of which purchase one or more items of a plurality of items (e.g., items 1-4). As described above, in some embodiments, each of the customers 1-15 can be a group of customers, and each of the items 1-4 can belong to a category of items. In the example of FIG. 6A, the incremental value assessment tool 102 selects an item that, when removed, causes a minimum incremental loss, based on the loss caused by a removal of the item-loyal customers who purchase that item. In the historical purchasing data 600a, the item causing a minimum incremental loss is item 2. Accordingly, as illustrated in the example data 602a, the selected item is item 2, the selected item-loyal customer is customer 13, the incremental loss caused by the removal of item 2 is $30, and the cumulative loss caused by the removal of only item 2 is $30.

In some embodiments, the example data 602a-d can include more or less data than illustrated in FIGS. 6A-6B. For example, the example data 602a-d can also include the incremental loss as a percentage, how many items have been selected and removed, an order of the items, a degree of uncertainty, metadata about the simulation, and other data. In the example of FIGS. 6A-6B, the incremental value of item 2 can be $30. In some examples, however, as described above, some of the $30 spent by the customer 13 can be transferred to a predicted replacement item, in which case the incremental value and incremental loss caused by the removal of item 2 can be less than $30.

The incremental value assessment tool 102 can then update the historical purchasing data, as described above in connection with FIG. 5. By updating the historical purchasing data, which can include, for example, removing customer 13, transferring purchases for exchanging customers who purchased item 2, combining customers, and removing item 2, the incremental value assessment tool 102 can convert the historical purchasing data 600a into the updated historical purchasing data 600b, which is displayed in FIG. 6B. Using the example historical purchasing data 600b, the incremental value assessment tool 102 can, for example, repeat aspects of methods of the present disclosure, which can include selecting an item of the historical purchasing data 600b. The item causing a minimum incremental loss when removed from the historical purchasing data 600b can be item 4. Accordingly, as shown in the example data 602b, the selected item can be item 4, the selected item loyal customer can be the combined customer 10 and 15 (who were combined, for example, when item 2 was removed), the incremental loss can be $100, and the cumulative loss, caused by removing item 2 and item 4, can be $130. The incremental value assessment tool 102 can again update the historical purchasing data, by for example, removing item 4, transferring the purchases of item 4, and combining customers, resulting in the example data 600c.

Using the historical purchasing data 600c, the incremental value assessment tool 102 can repeat aspects of methods of the present disclosure and can select item 3 as the item having a minimum incremental value. Accordingly, the example data 602c can indicate that the selected item is item 3, the selected item-loyal customer is the combined customer 5, 8, 11, and 14, the incremental loss caused by removing item 3 is $245, and the cumulative loss of removing items 2, 4, and 3 is $375. Updating historical purchasing data 600c results in historical purchasing data 600d, in which only item 1 remains. By selecting item 1, the incremental value assessment tool 102 can derive example data 602d, as shown in FIG. 6B. In the example simulation illustrated in FIGS. 6A-6B, an example order derived by the incremental value assessment tool 102 can be as follows: item 2, item 4, item 3, and then item 1. The incremental value assessment tool 102 can also generate and store information associated with each of the items. In some embodiments, the incremental value assessment tool 102 can display, among other things, data derived during the example simulation of FIGS. 6A-6B via a user interface.

Figure 7:
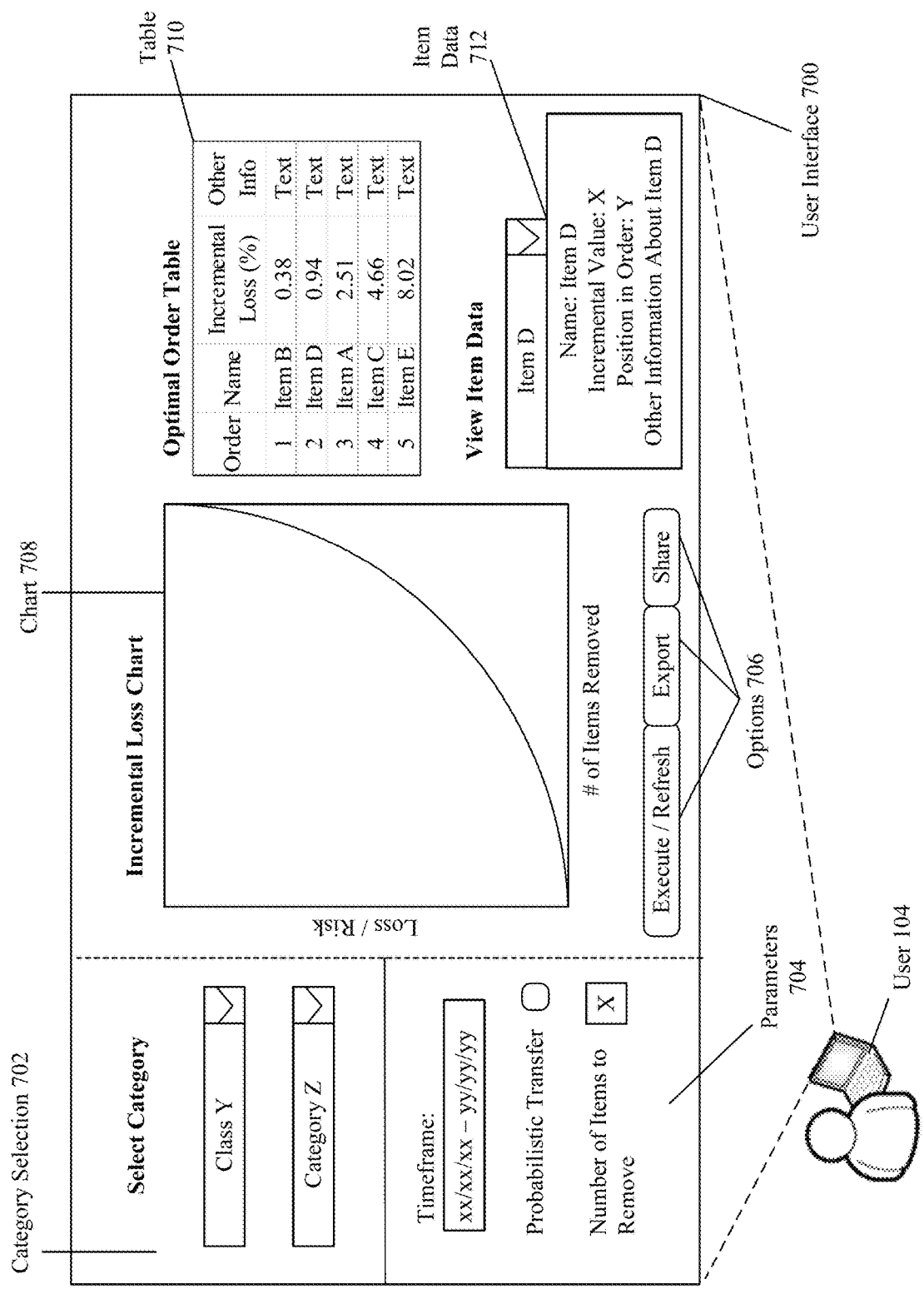
FIG. 7 illustrates an example user interface of an incremental value assessment tool.
Figure 8:
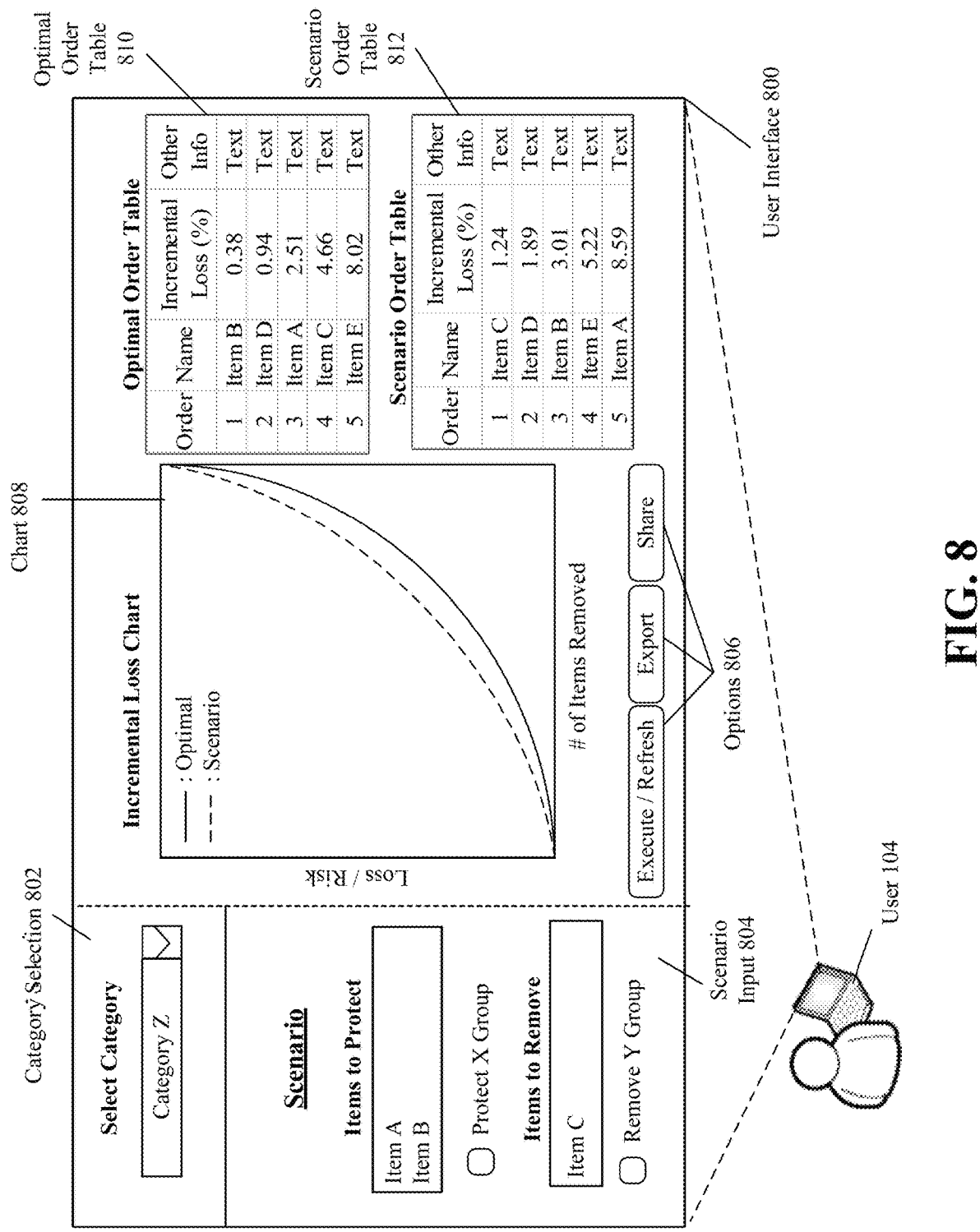
FIG. 8 illustrates an example user interface of an incremental value assessment tool.

FIGS. 7-8 illustrate example user interfaces of the incremental value assessment tool 102. As described above, the user 104 can access and interact with a user interface of the incremental value assessment tool 102. In some embodiments, the incremental value assessment tool 102 can include a plurality of user interfaces; in other embodiments, the incremental value assessment tool 102 can include only one user interface. In either case, the user interfaces depicted in the examples of FIGS. 7-8 are only examples of user interfaces that can be part of the incremental value assessment tool 102. The example data shown in the FIGS. 7-8 is for illustrative purposes and does not relate, for example, to the example of FIGS. 6A-6B. In some embodiments, aspects of the user interface 700 and the user interface 800 can be combined or discarded to form other example user interfaces. In some embodiments, the user interface of the incremental value assessment tool 102 does not use some of the features described in connection with FIGS. 7-8 and, in some embodiments, the user interface of the incremental value assessment tool 102 uses more, or different, features than those described in connection with FIGS. 7-8. Furthermore, the layout of the features included in the user interface of the incremental value assessment tool 102 can vary depending on the embodiment.

FIG. 7 illustrates an example user interface 700. The user interface 700 comprises a category selection field 702, execution parameters 704, and selectable options 706. Furthermore, the user interface 700 can display assessment data, which can include information derived by the incremental value assessment tool 102. For example, the assessment data displayed by the user interface 700 can include a chart 708, a table 710, and an item data field 712.

In some embodiments, the user 104 can use the category selection field 702 to select a category. Depending on the embodiment, the category selection field 702 can include a field for a user to type the name of a category, select a category from a list of categories, search for a category, or find and select a category in another way. The historical purchasing data can include items that belong to the category selected in the category selection field 702. In some embodiments, the category selection field can include a plurality of input fields. For example, a user can use a first category input field to select a class of categories, and then within that class of categories, a user can select a category by using a second input field. Furthermore, in some embodiments, the category selection field 702 can include more than two input fields, each of which can, in some way, relate to selecting, finding, or filtering for a category.

In some embodiments, the user 104 can input data via one or more execution parameters of the execution parameters 704. The incremental value assessment tool 102 can, for example, use these parameters when performing aspects of the present disclosure. In the example shown, the execution parameters 704 include a timeframe input field for indicating the time period for the historical purchasing data. Furthermore, the execution parameters 704 can include a field for selecting probabilistic transfer, which as described above, can cause the incremental value assessment tool 102 to use probabilities when updating historical purchasing data, for example to predict a replacement item for item-loyal customers or to transfer, based on a probability, purchases made by exchanging customers to other items. Furthermore, in some embodiments, the execution parameters 704 can include fields for the user 104 to provide further input regarding how the incremental value assessment tool 102 is to perform the probabilistic updating, such as by indicating which aspects of updating the purchasing data are to be based on a probability, how the probabilities are to be calculated, and what data is to be used when determining probabilities. Additionally, as shown, the execution parameters 704 can include a field for inputting how many items are to be selected and removed. For example, the user 104 can enter a number, and the incremental value assessment tool 104 can stop selecting and removing items from the purchasing data once it has reached that number. In other embodiments, the execution parameters 704 can include more of less parameters than those illustrated in the example of FIG. 7.

In some embodiments, the user interface 700 can include selectable options 706. The selectable options 706 can include, for example, a field for instructing the incremental value assessment tool 102 to execute a simulation. The field can be, for example, a button. In response to receiving an instruction to execute a simulation, the incremental value assessment tool 102 can, for example, execute aspects of the method 200. Furthermore, the selectable options 706 can include options to export or share data, such as data derived by the incremental value assessment tool 102 or displayed by the user interface of the incremental value assessment tool 102. In some embodiments, in response to receiving a selection of one of the selectable options 706 from a user computing device, a downstream application may be launched, and the data may be automatically exported to the downstream application, as described below with respect to FIG. 9. In other embodiments, the options 706 can include other options related to data management or to sending instructions to the incremental value assessment tool 102.

As described above, the user interface 700 can also include assessment data. The assessment data can include, for example, data related to the historical purchasing data, data derived by the incremental value assessment tool 102, data input by the user 104, data related to a loss curved generated by the incremental value assessment tool 102, and any other data used in connection with the incremental value assessment tool 102. In the user interface 700, the assessment data includes a chart 708, a table 710, and an item data field 712. The data included in the chart 708 can be derived by the incremental value assessment tool 102 while performing aspects of the present disclosure. For example, the x-axis of the chart can be the total number of items removed, and the y-axis can indicate a cumulative loss, or risk of loss. In the chart 708, as the number of items removed increases, the cumulative loss increases, and the rate of increase of the cumulative loss also increases. The data depicted in the chart 708 can be, for example, a loss curve generated by the incremental value assessment tool 102.

The table 710 can display information related to items of the historical purchasing data, such as the item name, its incremental loss or value (whether as a percentage or not as a percentage) and other information about the item. The table 710 can also display an order in which one or more of the items of the historical purchasing data were removed by the incremental value assessment tool 102, thereby providing one example of a representation of the order. As shown and as described above, in some embodiments, the incremental value assessment tool 102 can order items based on an ascending incremental value by repeatedly simulating a removal of the item that causes a minimum incremental loss when removed. This order can be an optimal order; therefore, the table 710 can be one example of a representation of the optimal order. Other examples of a representation of the order can include the chart 708, a list, or another representation.

The item data field 712 can include information about one or more specific items. In some embodiments, the item data field 712 can include an input field for selecting or for typing an item name, and the item data field 712 can include an output field for displaying information about the selected item. The displayed information can include, for example, the item name, its incremental value, its position in an order determined by the incremental value assessment tool 102, and other information about the item, such as notes about the item entered by the user 104 or relationships that the item may have with other items.

FIG. 8 illustrates an example user interface 800. The user interface 800 can include a category selection field 802, which like the category selection field 702, can be used to select a category for use in connection with the historical purchasing data. Furthermore, the user interface 800 can include options 806, which like the selectable options 706, can be used for, among other things, interacting with the incremental value assessment tool 102, exporting data, and managing data.

Furthermore, the user interface 800 can include a scenario input field 804. The scenario input field 804 can include, for example, a plurality of fields for entering data that can be used by the incremental value assessment tool 102 when executing a scenario simulation, which is described, for example, in connection with FIG. 5. For example, the scenario input field 804 can include a field for indicating that one or more items are protected and a field for indicating that one or more items are designated for priority removal. In the example of FIG. 8, items A and B are protected, and item C is designated for priority removal. Furthermore, the scenario input field 804 can include an option for protecting, or designating for priority removal, a group of items. The group of items can be, for example, items that belong to a certain brand or that share a certain characteristic, or they can be a group specified by the user 104 or by the incremental value assessment tool 102. Furthermore, in some embodiments, the scenario input field 804 can include a field for indicating whether the incremental value assessment tool 102 is to execute a simulation with the scenario input or without it. Furthermore, in some embodiments, the scenario input field 804 can include a field for indicating a conditional status of an item. For example, the conditional status can indicate that an item is protected or designated for priority removal, subject to a condition being met. The condition can relate, for example, to the scenario-based simulation or to information in the historical purchasing data or in the incremental value assessment tool 102. In some embodiments, the scenario input field 804 can include different fields than those illustrated in the example user interface 804.

The user interface 800 can further include assessment data. The assessment data can include the chart 808. Like the chart 708, the chart 808 can have an x-axis indicating a number of items removed and a y-axis indicating a cumulative loss, or risk of loss. Furthermore, the chart 808 can illustrate the results of multiple simulations. For example, the solid line can represent the results from a simulation in which the incremental value assessment tool 102 repeatedly selected and removed the item causing a minimum incremental loss, whereas the dashed line can represent a scenario simulation in which the incremental value assessment tool 102, when determining what item to select, accounted for the scenario input, possibly resulting in one or more items being selected before or after their optimal position. As shown, the cumulative loss/risk can increase at a different rate during a scenario simulation than a simulation without a scenario, thereby showing the relative effect of forcing inclusion or exclusion of particular items. In some embodiments, the chart 808 can also include data for a plurality of scenario simulations and other data related to simulations performed by the incremental value assessment tool 102.

Furthermore, in some embodiments, the chart 808 can include a plurality of loss curves generated by the incremental value assessment tool 102. For example, the chart 808 can illustrate a loss curve associated with an optimal order and a loss curve associated with a modified order, such as an order derived during a scenario-based simulation. Additionally, by overlaying both loss curves on one grid, the chart 808 can, in some embodiments, depict a comparison between an optimal order-based loss curve and a modified loss curve by showing the relative effect of forcing inclusion or exclusion of items during a scenario-based simulation.

The assessment data displayed by the user interface 800 can further include an optimal order table 810 and a scenario order table 812. Like the table 710 of FIG. 7, the tables 810-812 can include information about items and information derived by the incremental value assessment tool 102. Both of the tables can also represent an order of the items, the order being based on the order in which the items were removed by the incremental value assessment tool 102. Whereas the order represented in the scenario order table 812 accounts for the scenario input, the order represented in the optimal order table 810 does not. Other examples of representations of the optimal order and the scenario-based order can include the chart 808, one or more lists, or other representations.

Figure 9:
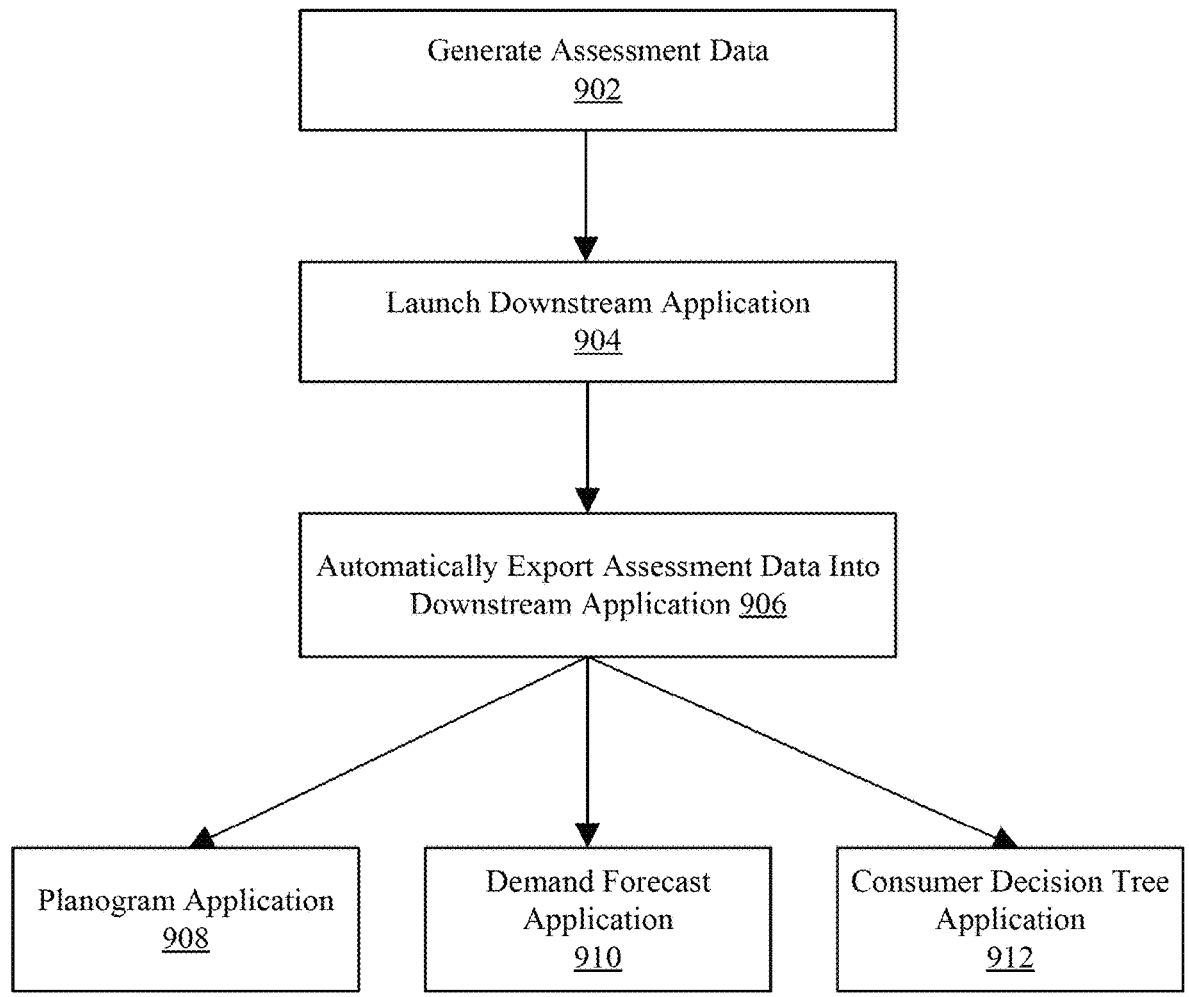
FIG. 9 illustrates a flowchart of an example integration of the output from the incremental value assessment tool into a downstream application.

FIG. 9 illustrates a flowchart of an example integration of the output from the incremental value assessment tool into a downstream application. The tool is configured to generate assessment data (operation 902). The output from the tool may include assessment data including predicted purchasing data for a plurality of customers based on the removal of an item from an item category assortment and data corresponding to the incremental loss of the item. The output from the tool may further include an incremental loss curve representative of the incremental loss associated with the number of items removed from the item category assortment. In some embodiments, in response to receiving a selection of a selectable option, such as the selectable options 706 and 806, a downstream application may be launched (operation 904). In response to launching the downstream application, the assessment data may be automatically exported into the downstream application by the value assessment API. For example, the assessment data may be exported into a planogram application (operation 908), a demand forecast application (operation 910) or a consumer decision tree application (912) for further analysis and/or processing by a retailer.

In embodiments where the assessment data is exported into a planogram application (operation 908), the downstream planogram application may display data associated with a current assortment, and the incremental loss data associated with each item, as generated by the tool, may be added to current assortment data. The assessment data may then be utilized downstream by the retailer to assist with planning the layout of items in its physical stores. For example, the incremental loss data generated by the tool may be beneficial for decision making by the retailer regarding changing which items are offered for sale when making changes to a store presentation for an item category. In embodiments where the assessment data is exported into a demand forecast application (operation 910), the assessment data may be utilized to optimize forecasted demand for an item by, for example, adjusting forecast estimates using the incremental loss associated with items. In embodiments where the assessment data is exported into a consumer decision tree application (912), the assessment data may be utilized to improve the accuracy of consumer decision trees, which in turn will improve assortment planning and management for the retailer.

Figure 10A:
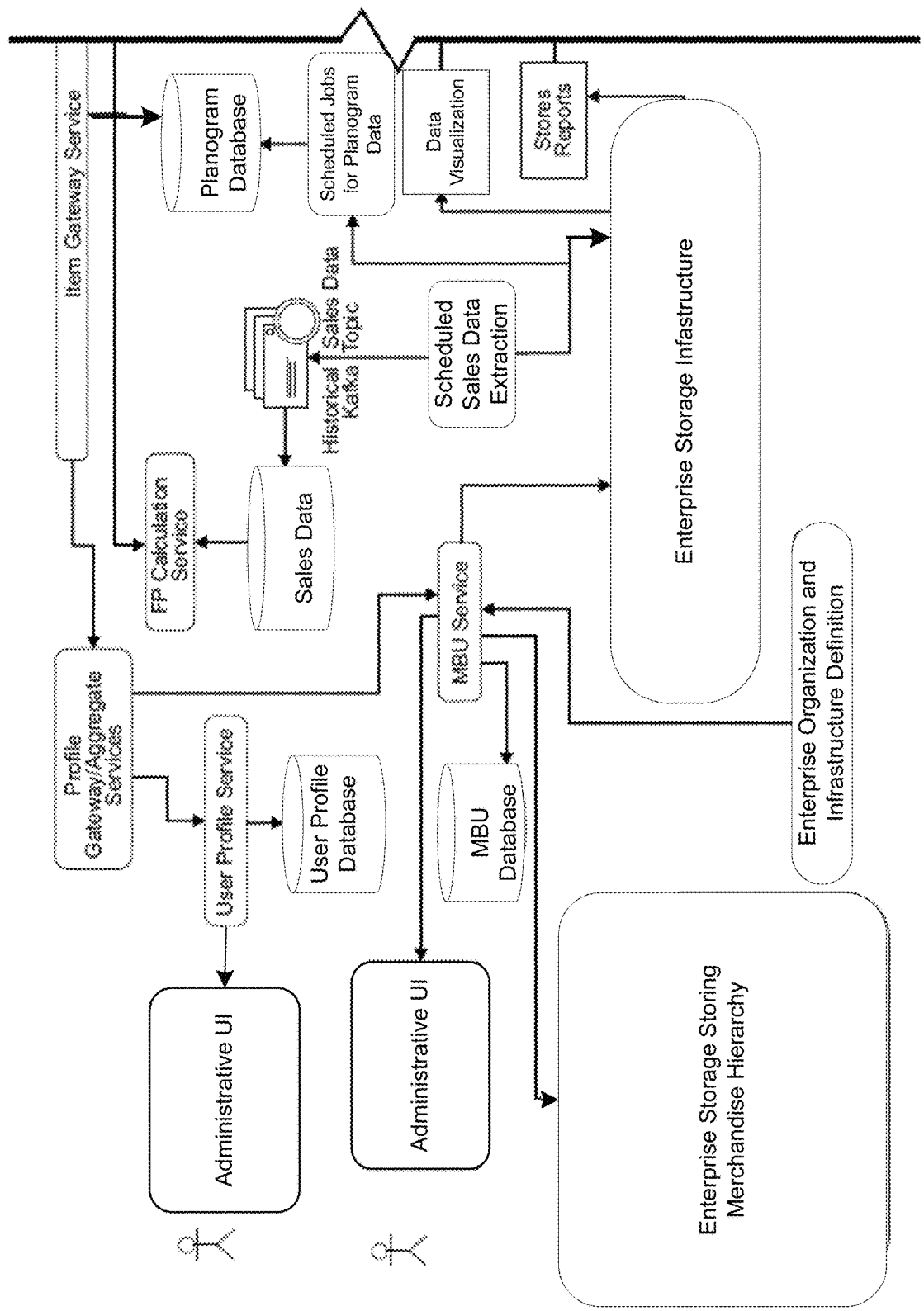
FIGS. 10A and 10B illustrates the incremental value assessment tool integrated within the context of a retail enterprise architecture.
Figure 10B:
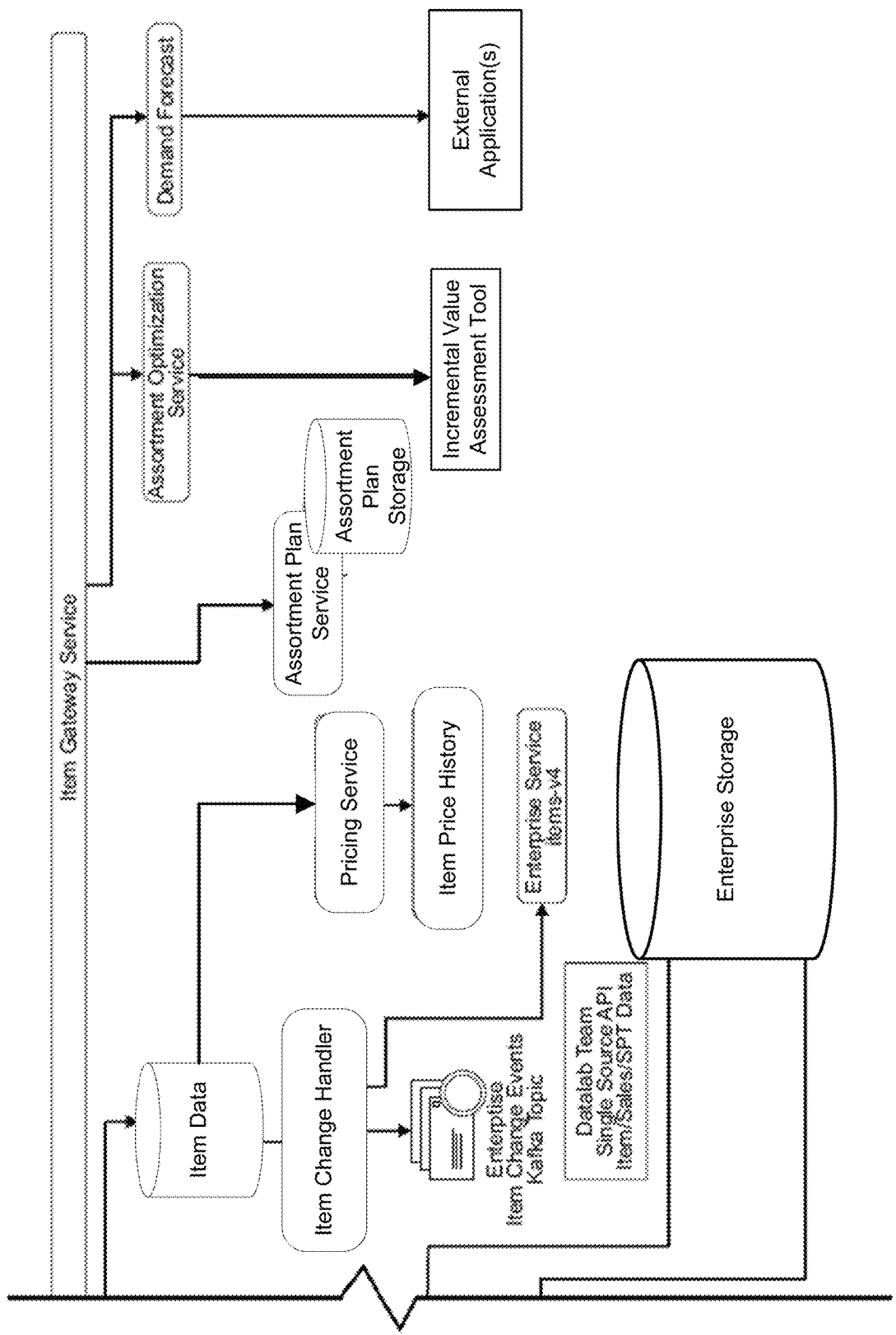

FIGS. 10A and 10B illustrate the incremental value assessment tool integrated within the context of a retail enterprise architecture. Item gateway services within the retail enterprise may be provided to coordinate all data associated with inventory items and to coordinate how inventory items are organized within the retail enterprise. In examples, the item gateway services analyze and coordinate at least item pricing, item organization, item demand, and assortment selection. The item gateway services may further include user profile services. A user profile service may interact with an administrative user interface displayed to an administrative user within the retailer, wherein the administrative user may utilize other gateway services for decision making regarding item assortment management. In examples, an administrative user may be presented with an administrative user interface to update user profiles based on the user profile service and a user profile database. Additionally, an administrative user may be presented with an administrative user interface to update merchandising business unit ("MBU") information. The merchandising business units within the retail enterprise may define a merchandise structure for the retail enterprise organization. In examples, enterprise organization and infrastructure details may be provided to MBU services for defining merchandise structures. Moreover, an MBU service may provide data to an enterprise storage system storing merchandise hierarchy information and to an enterprise storage infrastructure system.

In examples, the item gateway services include planogram services. A planogram database may be provided for storing data and information relevant to product layouts in physical retail stores. The item gateway services may further include an item data database, which may store information utilized by pricing services to determine future pricing for inventory items within the retail enterprise. Item price history may also be utilized to determine future pricing within the retail enterprise. Item gateway services may even further include assortment plan services for planning future item assortments, wherein an assortment plan storage database stores data regarding assortment planning. In addition to assortment plan services, the item gateway services may further include assortment optimization services. The assortment optimization services may include the incremental value assessment tool 102 described in detail herein. The incremental value assessment tool may publish its outputs to other systems and/or services within the retail enterprise and may present its outputs as visualizations on a user interface for a user, such as an administrative user. A demand forecast service may also be included in the item gateway service. Demand forecast services may predict future demand for inventory items, which may be utilized for decision making with respect to pricing, assortment planning, and other aspects of managing inventory items within the retail enterprise. The demand forecast service may provide data, results, and/or analysis to external applications for storing and/or further processing of demand forecasts.

Figure 11:
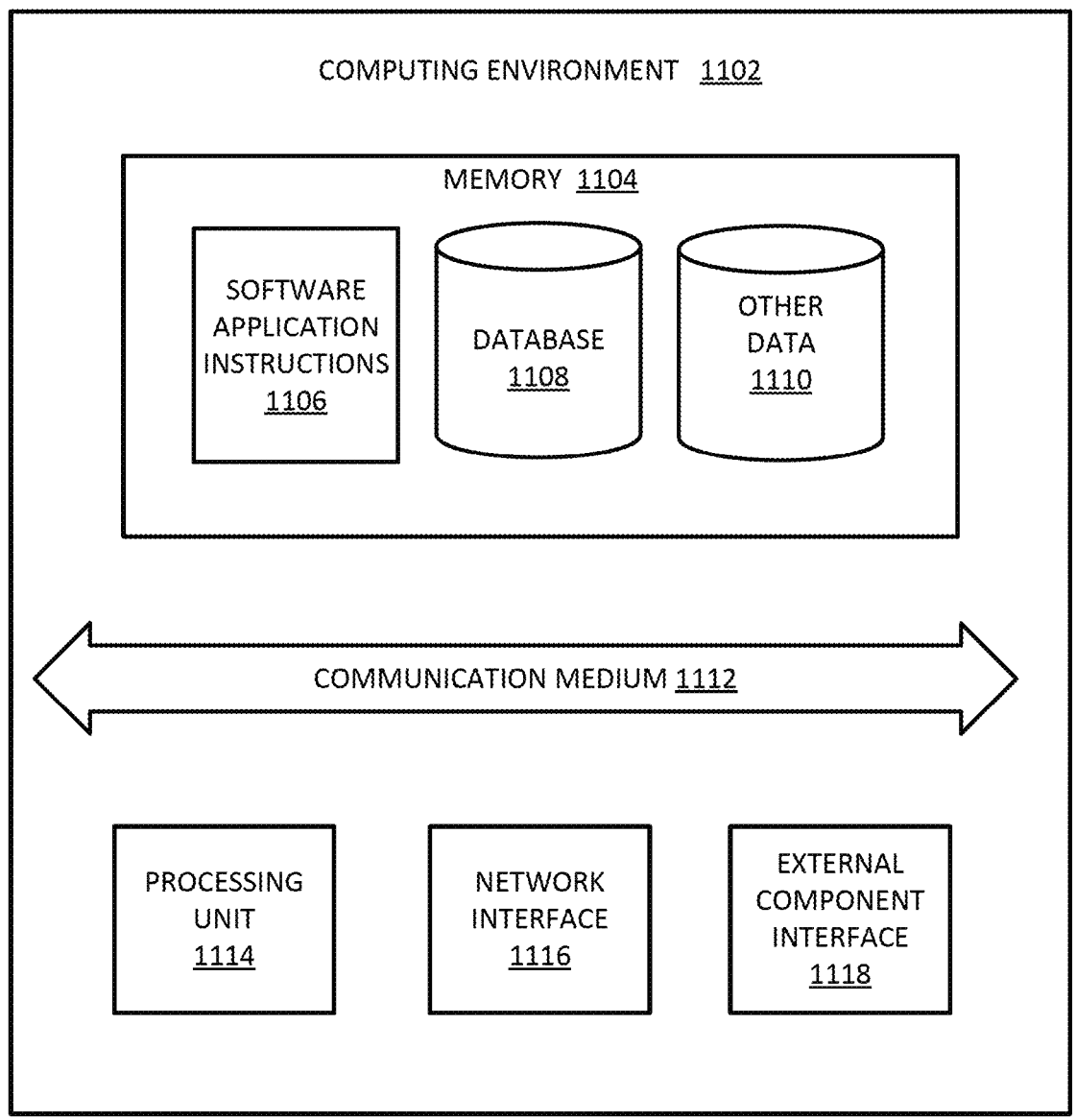
FIG. 11 illustrates an example block diagram of a computing system usable to implement aspects of the present disclosure.

FIG. 11 illustrates an example system 1100 with which disclosed systems and methods can be used. In an example, the following can be implemented in one or more systems 1100 or in one or more systems having one or more components of system 1100: the incremental value assessment tool 102, the user 104, the database 106, the management platform 110, the user interface 700, the user interface 800, and any other computing systems disclosed herein.

In an example, the system 1100 can include a computing environment 1102. The computing environment 1102 can be a physical computing environment, a virtualized computing environment, or a combination thereof. The computing environment 1102 can include memory 1104, a communication medium 1112, one or more processing units 1114, a network interface 1116, and an external component interface 1118.

The memory 1104 can include a computer readable storage medium. The computer storage medium can be a device or article of manufacture that stores data and/or computer-executable instructions. The memory 1104 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1104 can store various types of data and software. For example, as illustrated, the memory 1104 includes software application instructions 1106, one or more databases 1108, as well as other data 1110.

The communication medium 1112 can facilitate communication among the components of the computing environment 1102. In an example, the communication medium 1112 can facilitate communication among the memory 1104, the one or more processing units 1114, the network interface 1116, and the external component interface 1118. The communications medium 1112 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1114 can include physical or virtual units that selectively execute software instructions, such as the software application instructions 1106. In an example, the one or more processing units 1114 can be physical products comprising one or more integrated circuits. The one or more processing units 1114 can be implemented as one or more processing cores. In another example, one or more processing units 1114 are implemented as one or more separate microprocessors. In yet another example embodiment, the one or more processing units 1114 can include an application-specific integrated circuit (ASIC) that provides specific functionality. In yet another example, the one or more processing units 1114 provide specific functionality by using an ASIC and by executing computer-executable instructions.

The network interface 1116 enables the computing environment 1102 to send and receive data from a communication network (e.g., the network 108). The network interface 1116 can be implemented as an Ethernet interface, a token-ring network interface, a fiber optic network interface, a wireless network interface (e.g., Wi-Fi), or another type of network interface.

The external component interface 1118 enables the computing environment 1102 to communicate with external devices. For example, the external component interface 1118 can be a USB interface, Thunderbolt interface, a Lightning interface, a serial port interface, a parallel port interface, a PS/2 interface, or another type of interface that enables the computing environment 1102 to communicate with external devices. In various embodiments, the external component interface 1118 enables the computing environment 1102 to communicate with various external components, such as external storage devices, input devices, speakers, modems, media player docks, other computing devices, scanners, digital cameras, and fingerprint readers.

Although illustrated as being components of a single computing environment 1102, the components of the computing environment 1102 can be spread across multiple computing environments 1102. For example, one or more of instructions or data stored on the memory 1104 may be stored partially or entirely in a separate computing environment 1102 that is accessed over a network. Depending on the size and scale of the computing environment 1102, it may be advantageous to include one or more load balancers to balance traffic across multiple physical or virtual machine nodes. The environment 1102 may further include monitoring technology to determine when a node is not functioning so an appropriate action can be taken.

Aspects of the computing environment 1102 can be protected using a robust security model. In an example, users may be made to sign into the system using a directory service. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. An incremental value assessment system comprising:
   a user interface;
   a value assessment Application Programming Interface (API);
   a processing unit; and
   a memory storing instruction, wherein the instructions, when executed by the processing unit, cause the incremental value assessment system to:
      receive from a user computing device at the value assessment API:
         an item category selection at an item category selection field, the item category being associated with an item category assortment; and
         input to execute a scenario simulation at a scenario input field, the input indicating one or more items to protect or one or more priority removal items designated for removal from the item category assortment;
      receive, from an external database storing historical purchasing data for a plurality of item categories, historical purchasing data for a plurality of customers, wherein each customer of the plurality of customers purchases one or more items of a plurality of items within the item category assortment;
      for each item within the plurality of items within the item category assortment, using the historical purchasing data for the plurality of customers, simulate execution of removal of the item from the item category assortment, wherein removal of the item from the item category assortment causes an incremental loss associated with the item;
      ordering the plurality of items within the item category, based on an ascending incremental loss associated with each item, into an optimal order;
      using the historical purchasing data for the plurality of customers, execute the scenario simulation, wherein executing the scenario simulation includes generating simulation data comprising predicted purchasing data for the plurality of customers based on the one or more items to protect or the one or more priority removal items designated for removal from the item category assortment;
      display, via the user interface:
         a graphical view of assessment data, wherein the graphical view of assessment data includes concurrently displaying on a single graph a loss curve associated with the optimal order data and a loss curve associated with the scenario simulation data; and
         a listing of the one or more items included within the item category assortment, ordered based on incremental loss of each item in the listing, wherein the one or more items in the listing can be selected via the user interface to view additional item data in a drop down window;
      in response to displaying the assessment data, generate, on the user interface, a selectable navigational element configured to export the assessment data into a downstream application and automatically launch the downstream application;
      receive, via the user interface, at least one update to the one or more items to protect or to the one or more priority removal items designated for removal;
      receive, via a selectable option configured to execute a scenario simulation, a selection to execute an updated scenario simulation to generate updated scenario simulation data based on the at least one update to the one or more items to protect or to the one or more priority removal items designated for removal;

automatically update the graphical view of assessment data to include a loss curve associated with the updated scenario simulation data and to reorder the listing of the one or more items ordered based on incremental loss according to the updated scenario simulation data; and in response to receiving a selection via the selectable navigational element configured to export the assessment data, provide the assessment data to an item gateway service with instructions to route the assessment data to a downstream application.

2. The incremental value assessment system of claim 1, wherein the instructions, when executed, further cause the incremental value assessment system to update the historical purchasing data used to simulate execution of removing the item from the item category assortment by excluding historical purchase data for at least one customer.

3. The incremental value assessment system of claim 1, wherein the incremental loss is a minimum incremental loss.

4. The incremental value assessment system of claim 3, wherein the plurality of customers comprises one or more item-loyal customers, the historical purchasing data for the one or more item-loyal customers indicating that only the item of the plurality of items has been purchased; and wherein selecting the item of the plurality of items comprises:

determining that excluding the one or more item-loyal customers from the historical purchasing data used to simulate execution of removing the item from the item category assortment causes the minimum incremental loss.

5. The incremental value assessment system of claim 1, wherein the historical purchasing data further comprises a gross revenue, and wherein the incremental loss corresponds with an incremental decrease of the gross revenue.

6. The incremental value assessment system of claim 2, wherein the plurality of customers comprises exchanging customers and item-loyal customers, the historical purchasing data for exchanging customers indicating that the item and one or more other items of the plurality of items has been purchased, and the historical purchasing data for item-loyal customers indicating that only the item of the plurality of items has been purchased, wherein excluding historical purchase data for at least one customer comprises excluding one or more item-loyal customers from the historical purchasing data, and wherein simulating execution of removal of the item from the item category assortment comprises:

excluding the item from the historical purchasing data; and for exchanging customers, transferring a value associated with purchase of the item to the one or more other items.

7. The incremental value assessment system of claim 6, wherein the item-loyal customers comprise predicted transfer customers, and historical purchasing data for the predicted transfer customers is used to simulate execution of removing the item from the item category assortment, wherein simulating execution of removal of the item from the item category assortment further comprises for each of the predicted transfer customers, transferring the value associated with purchase of the item to a predicted replacement item of the plurality of items, and wherein, for exchanging customers, transferring the value associated with purchase of the item to the one or more other items comprises, for each of the exchanging customers, distributing the value associated with purchase of the item to the one or more other items based on a probability.

8. The incremental value assessment system of claim 1, wherein the historical customer purchasing data comprises single purchase customers and multi-purchase customers, and wherein the instructions, when executed, further cause the incremental value assessment system to:

exclude, from the historical purchasing data used to simulate execution of removing the item from the item category assortment, the single purchase customers; and group the multi-purchase customers based on similarities in historical purchase data.

9. The incremental value assessment system of claim 1, wherein the instructions, when executed, further cause the incremental value assessment system to:

select a second item of the plurality of items; and using the historical purchasing data for the plurality of customers, simulate execution of removal of the second item from the item category assortment, wherein removal of the item from the item category assortment causes a second incremental loss associated with the second item, and wherein the assessment data further comprises data corresponding to the second incremental loss associated with the second item.

10. The incremental value assessment system of claim 1, wherein the instructions, when executed, further cause the incremental value assessment system to, in response to receiving the selection of the selectable navigational element on the user interface from the user computing device, launch the downstream application and automatically export, via the value assessment API, the assessment data into the downstream application.

11. The incremental value assessment system of claim 1, wherein input to execute a scenario simulation indicates at least one item to protect.

12. The incremental value assessment system of claim 1, wherein the downstream application is at least one of a planogram application, a demand forecast application, or a consumer decision tree application.

13. A method for assessing incremental value comprising:

receiving, at a value assessment Application Programming Interface (API) from a user computing device:

an item category selection at an item category selection field, the item category being associated with an item category assortment; and input to execute a scenario simulation at a scenario input field, the input indicating one or more items to protect or one or more priority removal items designated for removal from the item category assortment;

receiving, from an external database storing historical purchasing data for a plurality of item categories, historical purchasing data for a plurality of customers, wherein each customer of the plurality of customers purchases one or more items of a plurality of items within the item category assortment;

for each item within the plurality of items within the item category assortment, using the historical purchasing data for the plurality of customers, simulating execution of removal of each of the plurality of items within the item category assortment, wherein removal of each item from the item category assortment causes an incremental loss associated with each item, and wherein each subsequent simulation executes removal of an additional item and simulations are performed until only one item remains in the item category assortment;

ordering the plurality of items within the item category, based on an ascending incremental loss associated with each item, into an optimal order;

using the historical purchasing data for the plurality of customers, execute the scenario simulation, wherein executing the scenario simulation includes generating simulation data comprising predicted purchasing data for the plurality of customers based on the one or more items to protect or the one or more priority removal items designated for removal from the item category assortment;

displaying, via a user interface:
- a graphical view of assessment data, wherein the graphical view of assessment data includes concurrently displaying on a single graph a loss curve associated with the optimal order data and a loss curve associated with the scenario simulation data; and
- a listing of the one or more items included within the item category assortment, ordered based on incremental loss of each item in the listing, wherein the one or more items in the listing can be selected via the user interface to view additional item data in a drop down window;

in response to displaying the assessment data, generating, on the user interface, a selectable navigational element configured to export the assessment data into a downstream application and automatically launch the downstream application;

receiving, via the user interface, at least one update to the one or more items to protect or to the one or more priority removal items designated for removal;

receiving, via a selectable option configured to execute a scenario simulation, a selection to execute an updated scenario simulation to generate updated scenario simulation data based on the at least one update to the one or more items to protect or to the one or more priority removal items designated for removal;

automatically updating the graphical view of assessment data to include a loss curve associated with the updated scenario simulation data and to reorder the listing of the one or more items ordered based on incremental loss according to the updated scenario simulation data; and in response to receiving a selection via the selectable navigational element configured to export the assessment data, providing the assessment data to an item gateway service with instructions to route the assessment data to a downstream application.

14. The method of claim 13, wherein the plurality of customers comprises exchanging customers and item-loyal customers, the historical purchasing data for exchanging customers indicating that the item and one or more other items of the plurality of items has been purchased, and the historical purchasing data for item-loyal customers indicating that only the item of the plurality of items has been purchased, the method further comprising:

updating the historical purchasing data used to simulate execution of removing the item from the item category assortment by excluding historical purchase data for one or more item-loyal customers, wherein simulating execution of removal of the item from the item category assortment comprises:
- excluding the item from the historical purchasing data; and
- for exchanging customers, transferring a value associated with purchase of the item to the one or more other items.

15. The method of claim 13, further comprising:
receiving a selection of the selectable navigational element on the user interface from the user computing device;

in response to receiving the selection, launching the downstream application; and automatically exporting, via the assessment API, the assessment data into the downstream application, wherein the downstream application is at least one of a planogram application, a demand forecast application, or a consumer decision tree application.

16. A system for assessing incremental value for a plurality of items within an item category assortment, the system comprising:
a user interface;
a value assessment Application Programming Interface (API); and
a computing system including a database, a processor, and a memory communicatively coupled to the processor, the memory storing instructions executable by the processor to:
receive from a user computing device at the value assessment API:
an item category selection at an item category selection field, the item category being associated with an item category assortment; and
input to execute a scenario simulation at a scenario input field, the input indicating one or more items to protect or one or more priority removal items designated for removal from the item category assortment;

receive, from an external database storing historical purchasing data for a plurality of item categories, historical purchasing data for a plurality of customers, wherein each customer of the plurality of customers purchases one or more items of a plurality of items within the item category assortment, the plurality of customers comprising exchanging customers and item-loyal customers, the historical purchasing data for exchanging customers indicating that more than one item of the plurality of items has been purchased, and the historical purchasing data for item-loyal customers indicating that only one of the plurality of items has been purchased;

using the historical purchasing data for the plurality of customers, simulate execution of removal of the item from the item category assortment, wherein removal of the item from the item category assortment causes an incremental loss associated with the item, and wherein simulating execution of removal of the item from the item category assortment comprises:
excluding customers from the historical purchasing data that have only made a single purchase of one item of the plurality of items;

for each of the plurality of items, analyzing the incremental loss of removing the item from the item category assortment by, for exchanging customers, transferring a value associated with purchase of the item to the one or more other items, and excluding historical purchase data for item-loyal customers who have only bought the item;

based on the incremental loss associated with each of the plurality of items, determining an order of removal of the plurality of items within the item category assortment, the order of removal being an ordered list based on an ascending incremental loss associated with removal of each of the plurality of items, wherein the ordered list represents an optimal order;

for each item within the plurality of items within the item category assortment, using the historical purchasing data for the plurality of customers, execute the scenario simulation, wherein executing the scenario simulation includes generating simulation data comprising predicted purchasing data for the plurality of customers based on the one or more items to protect or the one or more priority removal items designated for removal from the item category assortment; and display, via the user interface:
- a graphical view of assessment data, wherein the graphical view of assessment data includes concurrently displaying on a single graph a loss curve associated with the optimal order data and a loss curve associated with the scenario simulation data; and
- a listing of the one or more items included within the item category assortment, ordered based on incremental loss of each item in the listing, wherein the one or more items in the listing can be selected via the user interface to view additional item data in a drop down window;

in response to displaying the assessment data, generate, on the user interface, a selectable navigational element configured to export the assessment data into a downstream application and automatically launch the downstream application;

receive, via the user interface, at least one update to the one or more items to protect or to the one or more priority removal items designated for removal;

receive, via a selectable option configured to execute a scenario simulation, a selection to execute an updated scenario simulation to generate updated scenario simulation data based on the at least one update to the one or more items to protect or to the one or more priority removal items designated for removal;

automatically update the graphical view of assessment data to include a loss curve associated with the updated scenario simulation data and to reorder the listing of the one or more items ordered based on incremental loss according to the updated scenario simulation data; and in response to receiving a selection via the selectable navigational element configured to export the assessment data, provide the assessment data to an item gateway service with instructions to route the assessment data to a downstream application.

17. The system of claim 16, the memory storing instructions further executable by the processor to:

receive a modification to the order of removal based on at least one item being protected or designated for priority removal; and generate a modified incremental loss curve representative of the incremental loss associated with the number of items removed from the item category assortment in the modified order of removal; and display, on the user interface, a comparison of the incremental loss curve and the modified incremental loss curve.

18. The system of claim 16, wherein the historical purchase data is specific to one or more retail locations within a supply chain network, and the memory storing instructions further executable by the processor to:

automatically provide the incremental loss curve to the supply chain network for implementation at the one or more retail locations for item category assortment optimization.

* * * * *